(12) United States Patent
Inoue et al.

(10) Patent No.: US 9,531,471 B2
(45) Date of Patent: Dec. 27, 2016

(54) OPTICAL RECEIVER

(71) Applicant: Renesas Electronics Corporation, Kanagawa (JP)

(72) Inventors: Satoshi Inoue, Kanagawa (JP); Taiki Komori, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 2 days.

(21) Appl. No.: 14/742,347

(22) Filed: Jun. 17, 2015

(65) Prior Publication Data

US 2015/0372767 A1    Dec. 24, 2015

(30) Foreign Application Priority Data

Jun. 19, 2014 (JP) ................. 2014-126208

(51) Int. Cl.
  *H04B 13/02* (2006.01)
  *H04B 10/116* (2013.01)

(52) U.S. Cl.
  CPC .................. *H04B 10/116* (2013.01)

(58) Field of Classification Search
  CPC .......... H03F 3/08; H03F 3/087; H03G 1/0047; H04B 10/674; H04B 10/6911; H04B 10/116
  USPC ....................................... 398/118
  See application file for complete search history.

(56) References Cited

U.S. PATENT DOCUMENTS

| 6,037,999 A * | 3/2000 | Kunishima | .......... H03G 3/3052 348/678 |
| 7,193,459 B1 * | 3/2007 | Epperson | ................. H03C 5/00 330/130 |
| 2010/0245289 A1 * | 9/2010 | Svajda | .................. G06F 3/0421 345/175 |
| 2013/0291013 A1 * | 10/2013 | Choi | ...................... H04H 20/59 725/33 |
| 2014/0147110 A1 * | 5/2014 | Seo | .................... H04B 10/6932 398/25 |

FOREIGN PATENT DOCUMENTS

JP    2013-005327 A    1/2013

* cited by examiner

*Primary Examiner* — Don N Vo
(74) *Attorney, Agent, or Firm* — McDermott Will & Emery LLP

(57) ABSTRACT

A filter is supplied with a waveform signal generated based on an output from the light receiving element. At a subsequent stage of the filter, a voltage generation circuit and a variable gain amplifier are provided. The voltage generation circuit generates a reference voltage to regulate a bias voltage for an output waveform. The variable gain amplifier amplifies a filter output waveform using a variable gain. The control circuit controls a reference voltage based on an output from the variable gain amplifier and performs automatic gain control for the variable gain amplifier. The control circuit boosts a bias voltage for a filter output waveform based on the reference voltage according to an unnecessarily dull output waveform from the variable gain amplifier. In addition, the control circuit performs control so that a gain of the variable gain amplifier is smaller than a present gain.

16 Claims, 17 Drawing Sheets

Position information
- Latitude: 35/39/26.15,
- Longitude: 139/44/30.87,
- Height: 2

OPTICAL RECEIVER

CROSS-REFERENCE TO RELATED APPLICATIONS

The present application claims priority from Japanese Patent Application JP 2014-126208 filed on Jun. 19, 2014, the content of which is hereby incorporated by reference into this application.

BACKGROUND

The present invention relates to an optical receiver to receive an optical signal using visible light and more particularly to a technology effectively applied to an optical communication system that superimposes an optical modulation signal on LED (Light Emitting Diode) illuminating light to perform data communication.

Recently, the visible light communication technology using LED illumination has developed to cause increasing use of an apparatus that superimposes an optical modulation signal on visible light to perform data communication. For example, patent literature 1 describes the optical receiver applicable to the visible light communication. According to the description, a bandpass filter is used to extract frequency components from an electric signal output from a light receiving element (photodiode). An A/D converter is used to demodulate the signal. The described technology features "the direct-current component elimination process" and "the AGC amplification factor control." The technology extracts a direct-current component contained in an output signal from a first-stage amplifier, feeds a bias current back to an input side of the first-stage amplifier to cancel the direct-current component, and eliminates the direct-current component supplied to the first-stage amplifier. The technology applies a bias current to cancel a direct-current component so as to be able to eliminate the direct-current component from an electric signal applied to the first-stage amplifier and increase an amplification factor of the first-stage amplifier. This enables to receive a weak optical modulation signal and increase a dynamic range to receive optical modulation signals. The technology controls adjustment of a variable gain amplifier (AGC amplification factor control) only when a signal preamble is received, not always, to shorten the time to adjust the AGC amplification factor.

Patent literature: Japanese patent laid-open No. 2013-5327

SUMMARY

The inventors found that an electric signal output from a light receiving element (illuminance sensor) may become dull when an optical receiver receives a dark optical signal that indicates a small reception intensity. For example, the light receiving element outputs an electric signal that passes through a high-pass filter to remove a direct-current component. The signal is converted into a signal whose edge is emphasized. The automatic gain control is applied to the converted signal to generate a constant amplitude so that the signal amplitude conforms to the dynamic range of an A/D converter at a subsequent stage. A predetermined determination threshold value is used to determine a logical value for the A/D-converted data. The determination result data is used for a predetermined data process. In this case, the high-pass filter outputs a dull signal if a received optical signal is dark. The dullness is caused by the amperage of an electric signal capable of being output from the light receiving element and the capacitor capacitance of the high-pass filter. A decrease in the amperage of the electric signal output from the light receiving element consumes the time to charge the capacitor to increase the time to raise a waveform. The fall time depends on the discharge time corresponding to capacitor characteristics and is independent of the intensity of the received optical signal. According to operation timings of the high-pass filter, the discharge may start before the capacitor is fully charged. In such a case, an output waveform contains different amplitudes upward and downward. This causes an error between the high period and the low period in a waveform signal. It may be difficult to correctly receive an optical signal. A decrease in the amperage of an electric signal output from the light receiving element causes an unstable relationship between the charge time and the discharge time at a subsequent stage. This makes it difficult to correctly receive an optical signal.

These and other objects and novel features of the invention may be readily ascertained by referring to the following description and appended drawings in this specification.

The following summarizes representative embodiments of the invention disclosed in this application.

A light receiving element receives an optical signal and converts the optical signal into an electric signal. A filter is supplied with a waveform signal generated based on an output from the light receiving element. At a subsequent stage of the filter, a voltage generation circuit and a variable gain amplifier are provided. The voltage generation circuit generates a reference voltage to regulate a bias voltage for an output waveform output from the filter. The variable gain amplifier amplifies a filter output waveform output from the filter using a variable gain. The control circuit controls a reference voltage based on an output from the variable gain amplifier and performs automatic gain control for the variable gain amplifier. The control circuit boosts a bias voltage for a filter output waveform based on the reference voltage according to an unnecessarily dull output waveform from the variable gain amplifier. In addition, the control circuit performs control so that a gain of the variable gain amplifier is smaller than a present gain.

The following summarizes an effect available from representative embodiments of the invention disclosed in this application.

Data can be correctly received using an optical signal even if a light receiving element receives a weak optical signal.

DETAILED DESCRIPTION

1. Summary of the Embodiments

Figure 1:
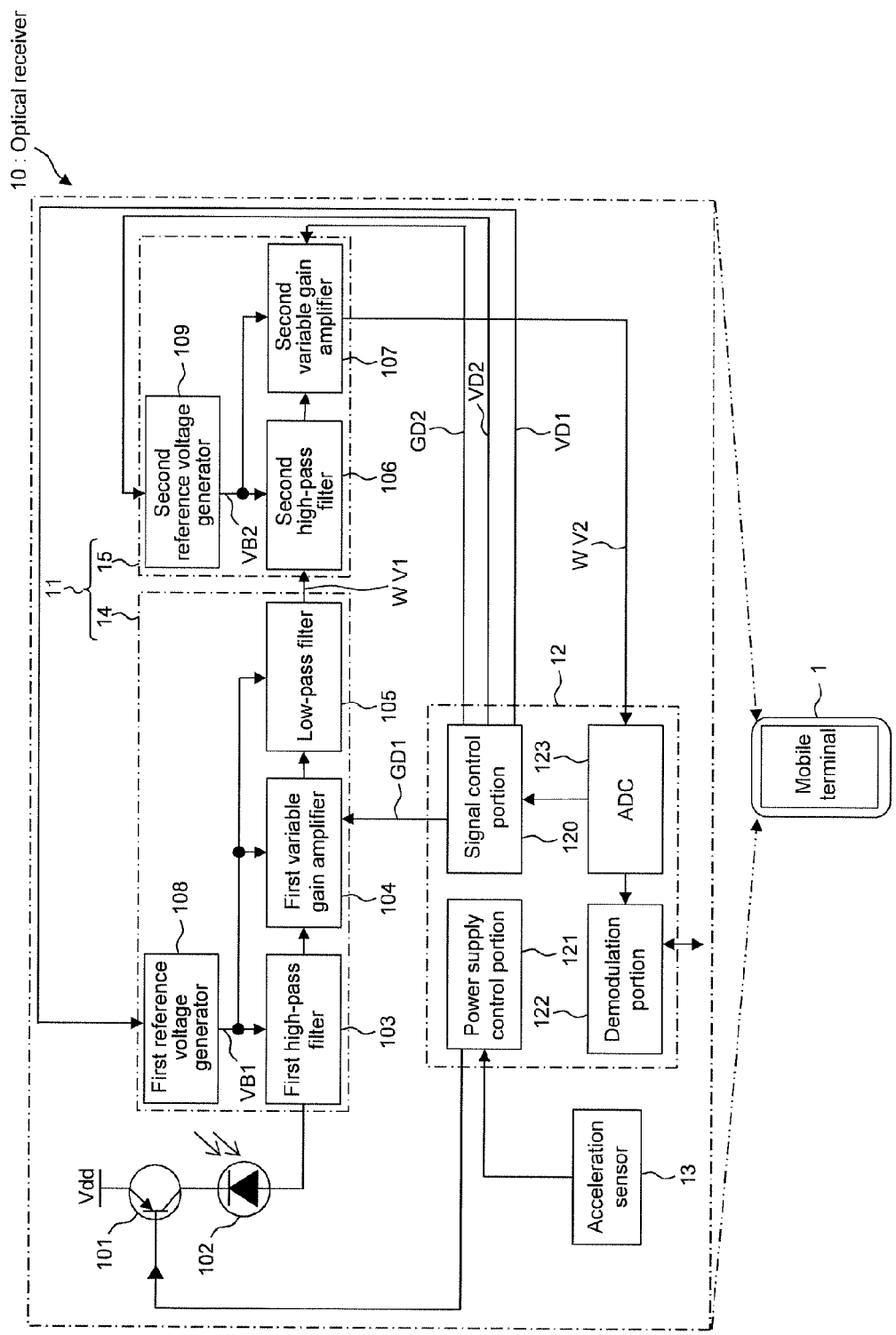
FIG. 1 is a block diagram illustrating an optical receiver.

The following summarizes an embodiment disclosed in the present application. The description below to summarize the embodiment contains a parenthesized reference symbol that is found in the accompanying drawings. The parenthesized reference symbol just exemplifies an instance included in the concept of a constituent element having the reference symbol.

[1] Correcting a Dull Signal Waveform

An optical receiver (10) includes a light receiving element (102), a first waveform generation circuit (14), a second waveform generation circuit (15), and a control circuit (12). The light receiving element receives an optical signal and converts it into an electric signal. The first waveform generation circuit is supplied with the electric signal output from the light receiving element and generates a first waveform signal (WV1) based on filtering and amplification. The second waveform generation circuit is supplied with the first waveform signal output from the first waveform generation circuit and generates a second waveform signal based on filtering and amplification. The control circuit performs bias voltage control and automatic gain control for the first waveform generation circuit and the second waveform generation circuit. The control circuit determines whether or not the second waveform signal (WV2) output from the second waveform generation circuit indicates an unnecessarily dull signal waveform. If the signal waveform is determined to be unnecessarily dull, the control circuit performs control to increase a bias voltage (BV2) in the second waveform generation circuit to be higher than at present and decrease the gain in the second waveform generation circuit to be smaller than at present.

When the light receiving element receives a weak optical signal, the light receiving element causes an output and the first waveform signal to be dull. The second waveform signal becomes dull to cause a difference in amplitudes at the positive polarity side and the negative polarity side. Even in such a case, the control circuit accordingly boosts the bias voltage for the second waveform generation circuit to decrease its gain. As a result, it is possible to alleviate a difference in amplitudes at the positive polarity side and the negative polarity side of the second waveform signal, prevent positive and negative bit widths for the second waveform signal from deviating from specified widths, and reduce a possibility of incorrectly determining a logical value for the second waveform signal. Therefore, it is possible to correctly receive data based on an optical signal even if the light receiving element receives a weak optical signal.

[2] Technique to Determine Whether or not a Signal Waveform is Dull

As described item 1 above, the control circuit determines whether or not the second waveform signal output from the second waveform generation circuit maintains a state of exceeding a logical value determination threshold value for a specified time period shorter than determination-slot time. If the state is maintained for the specified time period, the control circuit determines that the second waveform signal contains an unnecessarily dull waveform. If the state is not maintained for the specified time period, the control circuit determines that the second waveform signal does not contain an unnecessarily dull waveform (see FIG. 13).

This technique can reduce determination errors in comparison with a technique of determining whether or not the second waveform signal is distorted based on a high or low gain resulting from the automatic gain control. An electric signal waveform output from the light receiving element tends to be duller as the optical signal darkens. The waveform hardly dulls when the optical signal is bright. The waveform easily dulls when the optical signal is dark. This enables to identify whether the dullness tends to increase or decrease, based on the output voltage level of an electric signal output from the light receiving element. The light receiving element generates a high output voltage level when the optical signal is bright. The light receiving element generates a low output voltage level when the optical signal is dark. This tendency can provide such a relationship that the dullness increases when the automatic gain control generates a high gain and the dullness decreases when the automatic gain control generates a low gain. However, the automatic gain control needs to generate a high gain even when the optical signal is bright. This is the case where an output from the light receiving element saturates. When an output voltage saturates during the high period to turn on a light source, further increasing the brightness causes an output voltage during the low period to turn off the light source to approximate to a saturation voltage and decreases a difference between the output voltage during the high period and the output voltage during the low period. In such a case, the automatic gain control needs to generate a high gain. Therefore, it is necessary to determine whether the gain is increased because the optical signal is bright or because the optical signal is dark. The above-mentioned technique can be used for this purpose. This is because the level of the second waveform signal exceeds the logical value determination threshold value and, after a short time, returns to a bias voltage level when the waveform is not dull even if an amplification factor is large.

[3] Controlling the Reference Voltage Corresponding to a Voltage Waveform in the Second Waveform Generation Circuit As described in item 2 above, the control circuit may determine that the waveform of the second waveform signal does not unnecessarily dull. In this case, the control circuit uses the bias voltage (BV2) in the second waveform generation circuit as a first voltage. The control circuit may determine that the waveform of the second waveform signal unnecessarily dulls. In this case, the control circuit assumes the bias voltage in the second waveform generation circuit to be a second voltage resulting from increasing the first voltage by a voltage corresponding to a ratio of the present gain to the maximum gain in the second waveform generation circuit (see FIG. 14).

The degree of a difference in amplitudes at the positive polarity side and the negative polarity side of the second waveform signal correlates with a gain under the automatic gain control. In consideration of this, it is possible to settle an increase of the second voltage with reference to the first voltage in a correlation with the present gain and contribute to optimizing the second voltage in consideration of decreasing a gain of the second waveform signal.

[4] Gain Control in the Second Waveform Generation Circuit

According to item 1 described above, a value for the second waveform signal output from the second waveform generation circuit may exceed a specified logical value determination threshold value (S1). In this case, the control circuit waits until a lapse of specified time from the timing to determine the logical value and acquires the value for the second waveform signal (S2 and S3). The specified time is shorter than the determination-slot time for the logical value determination. The control circuit determines whether or not the value for the acquired second waveform signal exceeds a first threshold value (S4). The control circuit initializes a first counter if the value does not exceed the first threshold value (S6). The control circuit increments the first counter by one if the value exceeds the first threshold value (S5). The control circuit decreases the gain of the second waveform generation circuit if a count value of the incremented first counter exceeds a first value (S7 and S8). The control circuit determines whether or not the acquired value for the second waveform signal exceeds a second threshold value lower than the first threshold value (S9). The control circuit initializes a second counter if the value exceeds the second threshold value (S11). The control circuit increments the second counter by one if the value falls short of the second threshold value (S10). The control circuit performs gain control to increase the gain of the second waveform generation circuit if a count value of the second counter exceeds a second value (S12 and S13).

This technique relatively easily enables to prevent the control convergence from degrading due to excessive automatic gain control.

[5] Technique of Determining Signal Waveform Dullness and Reference Voltage Control Corresponding to a Voltage Waveform in the Second Waveform Generation Circuit In item 4 described above, the control circuit determines whether or not the second waveform signal output from the second waveform generation circuit maintains a state exceeding the logical value determination threshold value for a specified time period shorter than the determination-slot time (S21). If the state is not maintained for the specified time period, the control circuit determines that the second waveform signal does not indicate an unnecessarily dull waveform. The control circuit uses the bias voltage of the second waveform generation circuit as a first voltage (S22). If the state is maintained for the specified time period, the control circuit determines that the waveform of the second waveform signal unnecessarily dulls. The control circuit assumes the bias voltage in the second waveform generation circuit to be a second voltage resulting from increasing the first voltage by a voltage corresponding to a ratio of the present gain to the maximum gain in the second waveform generation circuit (S23).

This can reduce errors in the determination whether or not the second waveform signal is distorted.

[6] First Waveform Generation Circuit

In item 1 described above, the first waveform generation circuit includes a first high-pass filter (103), a first variable gain amplifier (104), a low-pass filter (105), and a first reference voltage generator (108). The first high-pass filter is supplied with an electric signal output from the light receiving element and emphasizes a changed edge of the signal. The first variable gain amplifier amplifies an output from the first high-pass filter using a variable gain. The low-pass filter is supplied with an output from the variable gain amplifier, removes a noise of high-frequency components, and outputs the first waveform signal. The first reference voltage generator generates a reference voltage that specifies a first bias voltage for output signal waveforms from the first high-pass filter, the first variable gain amplifier, and the low-pass filter.

As described above, the first waveform generation circuit can be relatively easily configured.

[7] Second Waveform Generation Circuit

In item 6 described above, the second waveform generation circuit includes a second high-pass filter (106), a second variable gain amplifier (107), and a second reference voltage generator (109). The second high-pass filter is supplied with the first waveform signal output from the low-pass filter and emphasizes a changed edge of the signal. The second variable gain amplifier amplifies an output from the second high-pass filter using a variable gain. The second reference voltage generator generates a reference voltage that specifies a second bias voltage for output signal waveforms from the second high-pass filter and the second variable gain amplifier.

As described above, the second waveform generation circuit can be relatively easily configured.

[8] Controlling a Gain of the Second Waveform Generation Circuit Using an Average Value of Peak Values According to item 1 described above, a value for the second waveform signal output from the second waveform generation circuit may exceed a first logical value determination threshold value. In this case, the control circuit waits until a lapse of specified time from the timing to determine the logical value and acquires a value for the second waveform signal (S33). The specified time is shorter than the determination-slot time for the logical value determination. The control circuit calculates an average value of the presently acquired value and one or more values most recently acquired for the second waveform signal (S34). If the average value exceeds a first threshold value, the control circuit decreases the gain of the second waveform generation circuit (S35 and S36). If the average value does not exceed a second threshold value lower than the first threshold value, the control circuit performs gain control to increase the gain of the second waveform generation circuit (S37 and S38).

This technique relatively easily enables to prevent the control convergence from degrading due to excessive automatic gain control.

[9] Controlling a Gain of the Second Waveform Generation Circuit According to a Tendency of Increasing or Decreasing Peak Values In item 1 described above, a value for the second waveform signal output from the second waveform generation circuit may exceed a specified logical value determination threshold value (S41). In this case, the control circuit waits until a lapse of specified time from the timing to determine the logical value and acquires the value for the second waveform signal (S42 and S43). The specified time is shorter than the determination-slot time for the logical value determination. The control circuit determines a magnitude relationship between the presently acquired value for the second waveform signal and the previously acquired value for the second waveform signal (S44). If the value for the second waveform signal tends to increase, the control circuit increments the first counter by one and initializes the value of the second counter (S45 and S46). If the value for the second waveform signal tends to decrease, the control circuit increments the second counter by one and initializes the value of the first counter (S47 and S48). The control circuit performs the gain control as follows. When the count value of the first counter exceeds a first value, the control circuit decreases the gain of the second waveform generation circuit (S49 and S50). When the count value of the second counter exceeds a second value, the control circuit increases the gain of the second waveform generation circuit (S51 and S52).

This technique relatively easily enables to prevent the control convergence from degrading due to excessive automatic gain control.

[10] Changing a Threshold Value for Logical Values

The optical receiver (10) includes alight receiving element (102), a waveform generation circuit (11), and a control circuit (12). The light receiving element receives an optical signal and converts it into an electric signal. The waveform generation circuit is supplied with the electric signal output from the light receiving element and generates a waveform signal based on filtering and amplification. The control circuit performs bias voltage control and automatic gain control for the waveform generation circuit. The control circuit also performs control to determine a logical value for the waveform signal supplied from the waveform generation circuit in units of specified determination slots. The control circuit determines whether or not the waveform signal output from the waveform generation circuit indicates an unnecessarily dull signal waveform (S61). If the signal waveform is determined not to be unnecessarily dull, a first determination criterion at a voltage side higher than a determination full-scale voltage is set to a first threshold voltage. A second determination criterion at a voltage side lower than the determination full-scale voltage is set to a second threshold voltage (S62). If the signal waveform is unnecessarily dull, a third determination criterion at a voltage side higher than the determination full-scale voltage is set to a voltage lower than the first threshold voltage by a voltage resulting from multiplying the present gain of the waveform generation circuit and a specified coefficient together. A fourth determination criterion at a voltage side lower than the determination full-scale voltage is set to a voltage lower than the voltage corresponding to the third determination criterion by a voltage intermediate between the first threshold voltage and the second threshold voltage (S63).

When the light receiving element may receive a weak optical signal, the waveform signal dulls to cause a difference between amplitudes at the positive polarity side and the negative polarity side. In such a case, the control circuit accordingly changes a determination threshold value for the waveform signal. The amount of a change in the determination threshold value is comparable to a voltage corresponding to the present gain of the waveform generation circuit. This is because the degree of a difference in amplitudes at the positive polarity side and the negative polarity side for the waveform signal correlates with the gain of the automatic gain control in the waveform generation circuit. It is possible to avoid an excessive change in the determination threshold value or, in other words, contribute to optimizing the determination threshold value to be changed.

[11] Controlling the Gain for the Waveform Generation Circuit

In item 10 described above, a value for the waveform signal output from the waveform generation circuit may exceed a specified logical value determination threshold value. In such a case, the control circuit waits until a lapse of specified time from the timing to determine the logical value and acquires the value for the second waveform signal. The specified time is shorter than the determination-slot time for the logical value determination. The control circuit determines whether or not the acquired value for the waveform signal exceeds the first threshold value. The control circuit initializes the first counter if the value does not exceed the first threshold value. The control circuit increments the first counter by one if the value exceeds the first threshold value. The control circuit decreases the gain of the waveform generation circuit if a count value of the incremented first counter exceeds a first value. The control circuit determines whether or not the acquired value for the second waveform signal exceeds the second threshold value lower than the first threshold value. The control circuit initializes the second counter if the value exceeds the second threshold value. The control circuit increments the second counter by one if the value falls short of the second threshold value. The control circuit performs gain control to increase the gain of the waveform generation circuit if a count value of the second counter exceeds a second value (see FIG. 11).

This technique relatively easily enables to prevent the control convergence from degrading due to excessive automatic gain control.

[12] Correcting a Dull Signal Waveform

The optical receiver (10) includes the light receiving element (102), a filter (106), a voltage generation circuit (109), a variable gain amplifier (107), and the control circuit (12). The light receiving element receives an optical signal and converts it into an electric signal. The filter is supplied with the waveform signal that is generated based on an output from the light receiving element. The voltage generation circuit generates a reference voltage that regulates a bias voltage for an output waveform output from the filter. The variable gain amplifier amplifies a filter output waveform output from the filter using a variable gain. The control circuit controls the reference voltage based on an output from the variable gain amplifier and performs automatic gain control for the variable gain amplifier. The control circuit boosts the bias voltage for the filter output waveform based on the reference voltage according to an unnecessarily dull output waveform from the variable gain amplifier. The control circuit also performs control so that the gain of the variable gain amplifier is smaller than the present one.

When the light receiving element may receive a weak optical signal, the waveform signal dulls to cause a difference between amplitudes at the positive polarity side and the negative polarity side. In such a case, the control circuit accordingly boosts the bias voltage for the waveform generation circuit and decreases the gain of the waveform generation circuit. As a result, it is possible to alleviate a difference in amplitudes at the positive polarity side and the negative polarity side of the waveform signal, prevent positive and negative bit widths for the waveform signal from deviating from specified widths, and reduce a possibility of incorrectly determining a logical value for the waveform signal. Therefore, it is possible to correctly receive data based on an optical signal even if the light receiving element receives a weak optical signal.

[13] Technique to Determine Whether or not a Signal Waveform is Dull

In item 12 described above, an output from the variable gain amplifier may exceed the logical value determination threshold value and this state may remain until a lapse of specified time shorter than the determination-slot time. In such a case, the control circuit determines that an output waveform from the filter unnecessarily dulls (see FIG. 13).

Similarly to item 2, this technique can reduce determination errors in comparison with a technique of determining whether or not the waveform signal is distorted based on a high or low gain resulting from the automatic gain control.

[14] Controlling the Reference Voltage

In item 12 described above, when determining that the output waveform from the filter does not unnecessarily dull, the control circuit assumes the bias voltage to be half a power-supply voltage. When determining that the output waveform from the filter unnecessarily dulls, the control circuit assumes the bias voltage to be half the power-supply voltage increased by a voltage corresponding to a ratio of the present gain to the maximum gain of the variable gain amplifier (see FIG. 14).

The degree of a difference in amplitudes at the positive polarity side and the negative polarity side of the waveform signal correlates with a gain under the automatic gain control. In consideration of this, it is possible to settle an increase of the bias voltage for a dull waveform compared to the bias voltage for a sharp waveform in a correlation with the present gain and contribute to optimizing the bias voltage in order to decrease the waveform signal gain when the waveform signal dulls.

[15] Automatic Gain Control of the Variable Gain Amplifier

In item 12 described above, the control circuit determines a logical value for an output from the variable gain amplifier and waits until a lapse of specified time from the timing to determine the logical value. The specified time is shorter than the determination-slot time. The control circuit further determines whether or not an output from the variable gain amplifier exceeds the first threshold value if the determined logical value exceeds the logical value determination threshold value. The control circuit initializes the first counter if the logical value does not exceed the logical value determination threshold value. The control circuit increments the first counter by one if the logical value exceeds the logical value determination threshold value. The control circuit decreases the gain of the variable gain amplifier if the count value of the incremented first counter exceeds a first value. The control circuit determines whether or not an output from the variable gain amplifier exceeds a second threshold value lower than the first threshold value. The control circuit initializes the second counter if the output exceeds the second threshold value. The control circuit increments the second counter by one if the output falls short of the second threshold value. The control circuit performs gain control to increase the gain of the variable gain amplifier if a count value of the second counter exceeds a second value (see FIG. 11).

This technique relatively easily enables to prevent the control convergence from degrading due to excessive automatic gain control.

[16] Optical Receiver that Includes an Acceleration Sensor and Receives Position Information Using an Optical Signal The optical receiver (10) includes the light receiving element (102), the waveform generation circuit (11), the control circuit (12), an acceleration sensor (13), and a power supply switch (101). The light receiving element receives an optical signal and converts it into an electric signal. The waveform generation circuit is supplied with an electric signal output from the light receiving element and generates a waveform signal based on filtering and amplification. The control circuit processes a waveform signal supplied from the waveform generation circuit. The power supply switch selects the power supply to the light receiving element. In a mode to receive position information using the optical signal, the control circuit turns on the power supply switch based on an output from the acceleration sensor only while movement of the optical receiver is sensed.

The light receiving element is activated only when the received position information needs to be updated. It is possible to greatly reduce the power consumption when the optical receiver does not move.

2. Further Detailed Description of the Embodiments

The embodiments will be described in further detail.

Overall Configuration of the Optical Receiver

Figure 2:
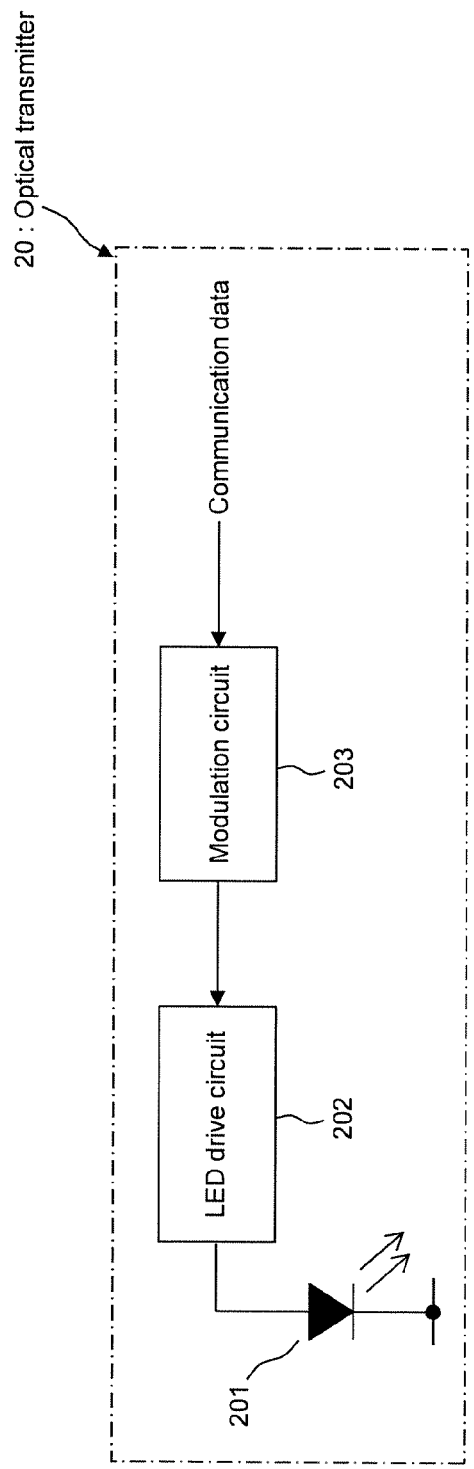
FIG. 2 is a block diagram illustrating an optical transmitter to perform optical communication with the optical receiver.
Figure 3:
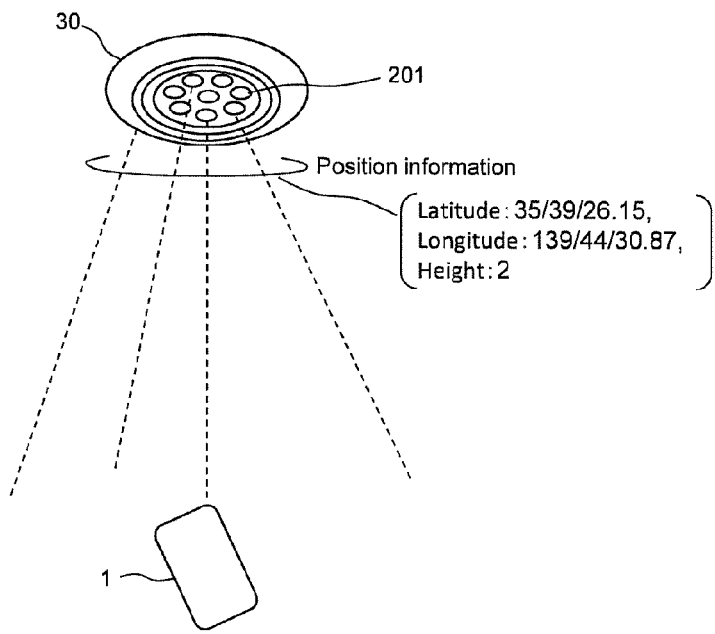
FIG. 3 is an explanatory diagram illustrating an LED lighting apparatus that uses an illuminating light source for optical transmission.

FIG. 1 illustrates an example of the optical receiver. An optical receiver 10 illustrated in FIG. 1 is provided for a mobile terminal 1 such as a mobile telephone or a smartphone. The optical receiver 10 is used for visible light communication that receives an optical signal from an optical transmitter 20 illustrated in FIG. 2. At the transmission side of the visible light communication, a modulation circuit 203 modulates transmission data to be transmitted. An LED drive circuit 202 drives an LED 201 according to the modulated signal to transmit an optical signal. As illustrated in FIG. 3, for example, many LED lighting apparatuses 30 are installed in an underground mall or a department store. The LED lighting apparatus 30 may include the optical transmitter 20. The LED 201 is used as an illuminating light source for the optical transmitter 20.

The optical receiver 10 allows a light receiving element 102 to receive the optical signal from the LED 201 and converts the optical signal into an electric signal. The optical receiver 10 demodulates the electric signal to recognize original data.

The optical receiver 10 includes a PIN or PN photodiode as the light receiving element 102, for example. A cathode of the light receiving element 102 is provided with a power supply switch 101 to apply power-supply voltage Vdd. An anode of the light receiving element 102 is coupled to a waveform generation circuit 11. The waveform generation circuit 11 is supplied with an electric signal output from the light receiving element 102 and generates a waveform signal based on filtering and amplification. The control circuit 12 is provided to process a waveform signal output from the waveform generation circuit 11. The control circuit is supplied with an output from an acceleration sensor 13. The control circuit 12 is coupled to an unshown processor portion that is included in the mobile terminal 10 and performs mobile communication processes and application processes.

The waveform generation circuit 11 includes a first waveform generation circuit 14 and a second waveform generation circuit 15. The first waveform generation circuit 14 is supplied with an electric signal output from the light receiving element 102 and generates a first waveform signal WV1 based on filtering and amplification. The second waveform generation circuit 15 is supplied with the first waveform signal WV1 output from the first waveform generation circuit 14, generates a second waveform signal WV2 based on filtering and amplification, and supplies the second waveform signal WV2 to the control circuit 12.

The first waveform generation circuit 14 includes a first high-pass filter 103, a first variable gain amplifier 104, a low-pass filter 105, and a first reference voltage generator 108, for example. The first high-pass filter 103 is supplied with an electric signal output from the light receiving element 102 and emphasizes a changed edge of the signal. The first variable gain amplifier 104 amplifies an output from the first high-pass filter 103 using a variable gain. The low-pass filter 105 is supplied with an output from the variable gain amplifier 104, removes a noise of high-frequency components, and outputs the first waveform signal WV1. The first reference voltage generator 108 generates a first reference voltage BV1 as the first bias voltage for output signal waveforms from the first high-pass filter, the first variable gain amplifier, and the low-pass filter.

The second waveform generation circuit 15 includes a second high-pass filter 106, a second variable gain amplifier 107, and a second reference voltage generator 109, for example. The second high-pass filter 106 is supplied with the first waveform signal WV1 output from the low-pass filter 105 and emphasizes a changed edge of the signal. The second variable gain amplifier 107 amplifies an output from the second high-pass filter 106 using a variable gain. The second reference voltage generator 109 generates a second reference voltage BV2 that specifies a second bias voltage for output signal waveforms from the second high-pass filter 106 and the second variable gain amplifier 107.

Figure 4:
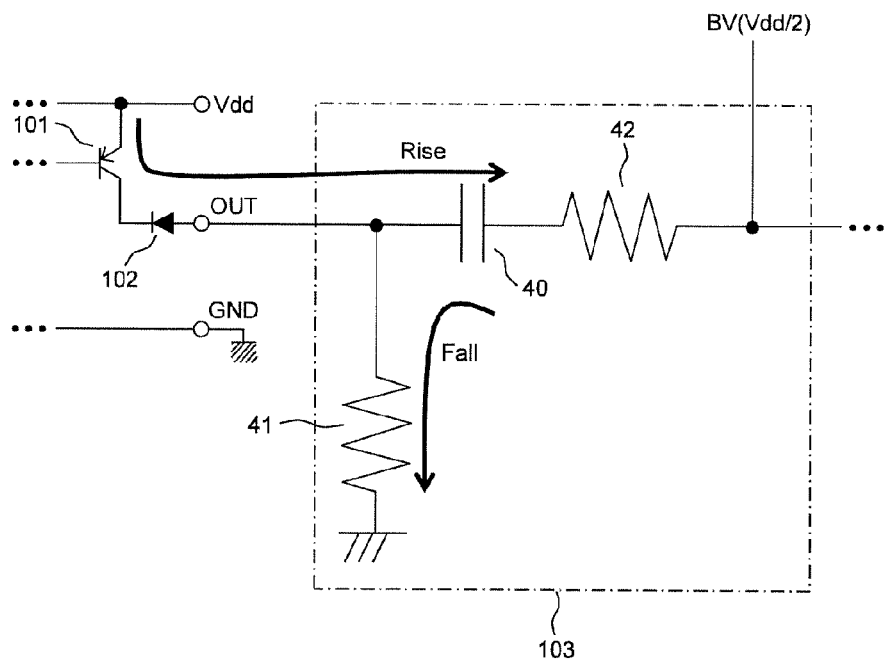
FIG. 4 is a circuit diagram illustrating a high-pass filter.

The first high-pass filter 103 can be configured as a CR filter using a capacitor 40, and resistors 41 and 42 as illustrated in FIG. 4, but not limited thereto. An output from the first high-pass filter 103 maintains a signal level centered at the bias voltage. A first reference voltage VB1 as the bias voltage is set to half of power-supply voltage Vdd.

Though not illustrated, the second high-pass filter 106 is configured similarly but the bias voltage is used as a second reference voltage VB2. An operational amplifier may be used for the high-pass filters 103 and 106.

Figure 5:
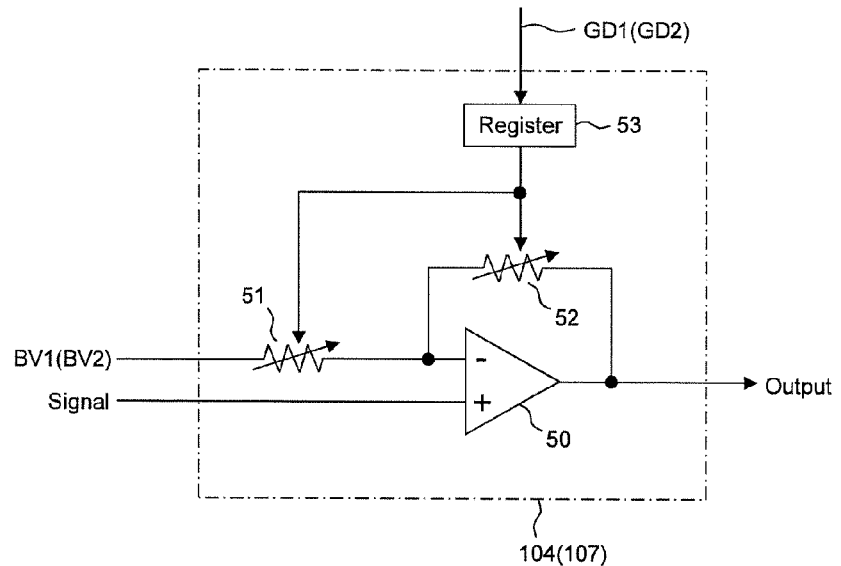
FIG. 5 is a circuit diagram illustrating a variable gain amplifier.

The first variable gain amplifier 104 may use a non-inverting amplifier circuit as illustrated in FIG. 5, but not limited thereto. An operational amplifier 50 uses an input resister 51 and a feedback resister 52 as variable resistors. The reference voltage BV1 is input to an inverting input terminal (−) via the input resister 51. A signal from the preceding stage is input to a non-inverting input terminal (+). Resistance values of the input resister 51 and the feedback resister 52 depend on register values the control circuit 12 supplies to a register 53. An output from the first variable gain amplifier 104 generates a signal variation of (R1+R2)/2 multiplied by an input voltage from the non-inverting input terminal (+). The variation is comparable to a voltage centered at the first reference voltage BV1 as the bias voltage. In the equation, R1 denotes a resistance value of the feedback resister 52 and R2 denotes a resistance value of the input resister 51.

Though not illustrated, the second variable gain amplifier 107 is supplied with the second reference voltage VB2 as the bias voltage and is configured similarly to the first variable gain amplifier 104. The first variable gain amplifier 104 and the second variable gain amplifier 107 settle gains according to setting values in the register 53. In FIG. 5, GD1 denotes gain control data for the first variable gain amplifier 109 placed in the register 53 and GD2 denotes gain control data for the second variable gain amplifier 107 placed in the register 53.

Figure 6:
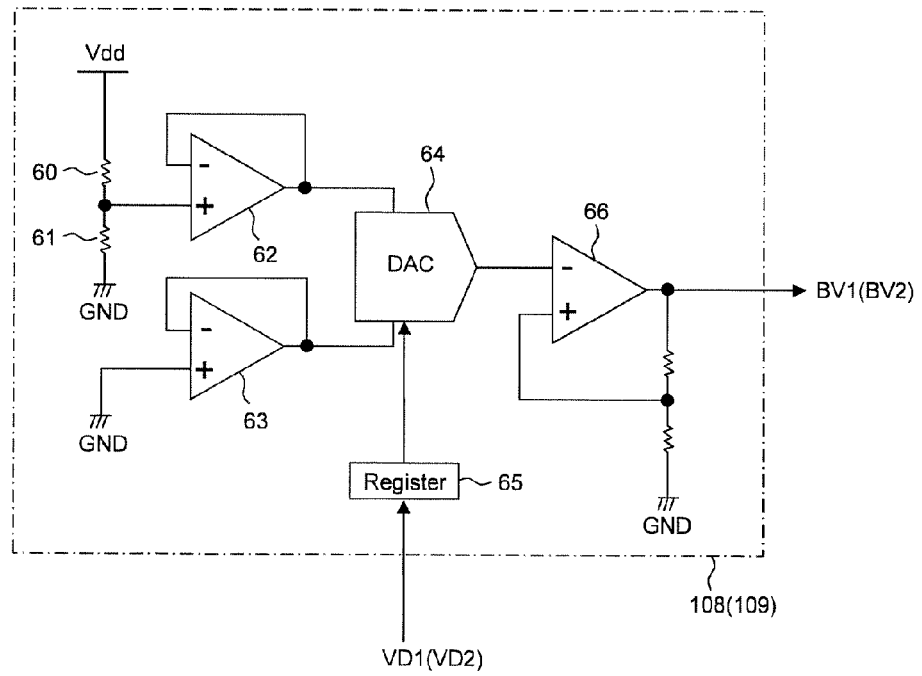
FIG. 6 is a block diagram illustrating a reference voltage generator.

As illustrated in FIG. 6, the first reference voltage generator 108 uses a digital-analog converter (DAC) 64 that converts a digital signal into an analog signal, but not limited thereto. As the power supply, the DAC 64 uses a ground voltage GND and a power-supply voltage. The ground voltage GND is supplied via a buffer amplifier 63. The power-supply voltage derives from dividing power-supply voltage Vdd by resistors 60 and 61 and is supplied via a buffer amplifier 62. An output voltage from the DAC 64 is determined depending on a register value which is set in the register 65 by the control circuit 12. A negative feedback amplifier 66 adjusts (trims) an output voltage from the DAC 64 to generate the first reference voltage VB1 as the bias voltage. Though not illustrated, the second reference voltage generator 109 is configured similarly. The first reference voltage generator 108 and the first reference voltage generator 109 settle the first reference voltage BV1 and the second reference voltage BV2 according to setting values in the register 65, but not limited thereto. A power-on reset process sets the first reference voltage generator 108 to a specified register value. Even after the power-on reset process, the second reference voltage generator 109 is set to a register value variably with dullness of a received waveform in optical communication. In FIG. 6, VD1 denotes voltage control data for the first reference voltage generator 108 placed in the register 65 and VD2 denotes voltage control data for the second reference voltage generator 109 placed in the register 65.

As illustrated in FIG. 1, the control circuit 12 includes a signal control portion 120, a power supply control portion 121, a demodulation portion 122, and an analog-digital converter (ADC) that converts an analog signal into a digital signal, for example. The signal control portion 120 and the demodulation portion 122 may use special hardware components. Alternatively, the signal control portion 120 and the demodulation portion 122 may each include a CPU to perform program processes, program memory to store programs executed by the CPU, and RAM used for a work area of the CPU.

An ADC 123 converts the waveform signal WV2 into digital data and supplies the converted data to the signal control portion 120 and the demodulation portion 122. Though not illustrated, the demodulation portion 122 and the signal control portion 120 may compare digital data for the waveform signal WV2 with the determination threshold value and require a result of the determination about the high period or the low period. In such a case, a determination result for one of the demodulation portion 122 and the signal control portion 120 may be transferred to the other.

The demodulation portion 122 identifies a logical value for the waveform signal WV2 based on data supplied from the ADC 123 and reproduces an optical communication signal.

The signal control portion 120 generates gain control data GD1 and GD2 to perform automatic gain control over the variable gain amplifiers 104 and 107. The signal control portion 120 generates voltage control data VD1 and VD2 to perform bias voltage control over the filters 103, 105, and 106, and the variable gain amplifiers 104 and 107. In particular, the bias voltage control and the automatic gain control performed by the control circuit 120 include a remedy for a dull electric signal that may be output from the light receiving element 102 when the light receiving element 102 receives a dark optical signal. The following describes the remedy in detail.

Signal Dullness Due to a Dark Optical Signal

Figure 7:
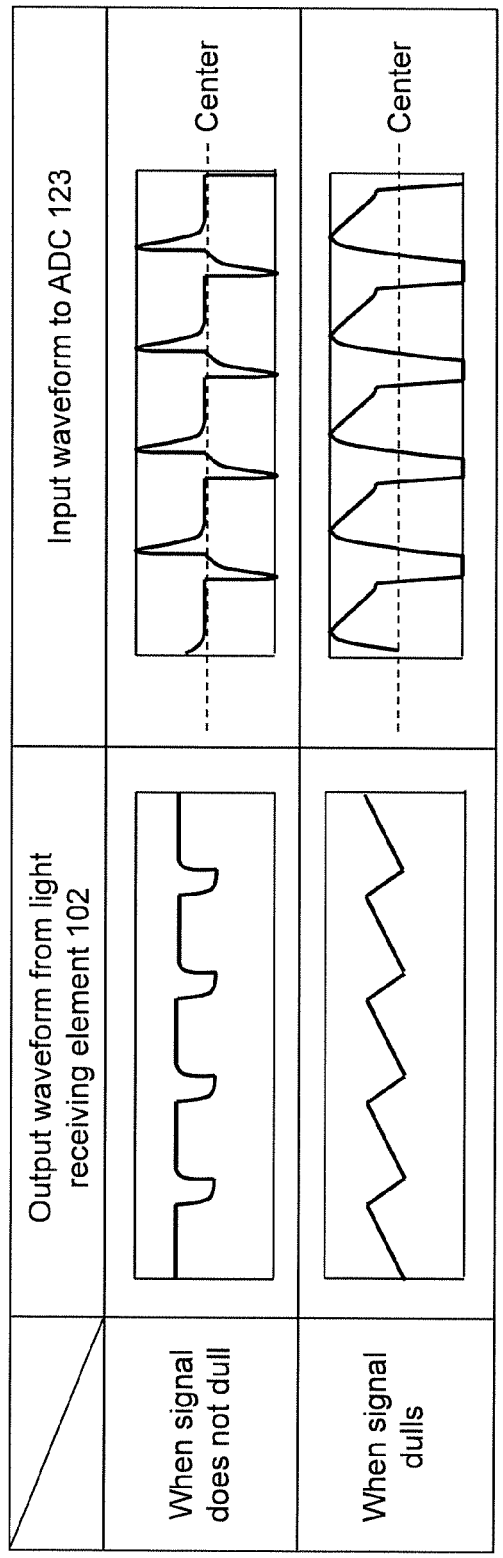
FIG. 7 is a waveform diagram illustrating comparison between an electric signal waveform output from the light receiving element and a signal waveform output from a waveform generation circuit and input to an ADC based on whether or not the signals are dull.

FIG. 7 illustrates comparison between an electric signal waveform output from the light receiving element and a signal waveform output from the waveform generation circuit and input to the ADC according to whether or not a signal is dull. A dark optical signal dulls an output waveform from the light receiving element. This relates to the amperage of an electric signal capable of output from the light receiving element 102 and the capacity of the capacitor 40 in the first high-pass filter 103 (see FIG. 4). A dark optical signal decreases the amperage the light receiving element 102 can output. The time to charge the capacitor 40 lengthens. The electric signal rise time lengthens accordingly. On the other hand, the fall time depends on the discharge time of the capacitor 40 and is independent of the brightness of the reception environment. If the capacitor 40 starts discharging before it is completely charged, the amplitude of an output waveform from the first high-pass filter 103 differs between the positive polarity (convex upward) and the negative polarity (convex downward). This difference results in dullness of an output waveform from the waveform generation circuit 11, namely, an input waveform to the ADC 123.

Figure 8:
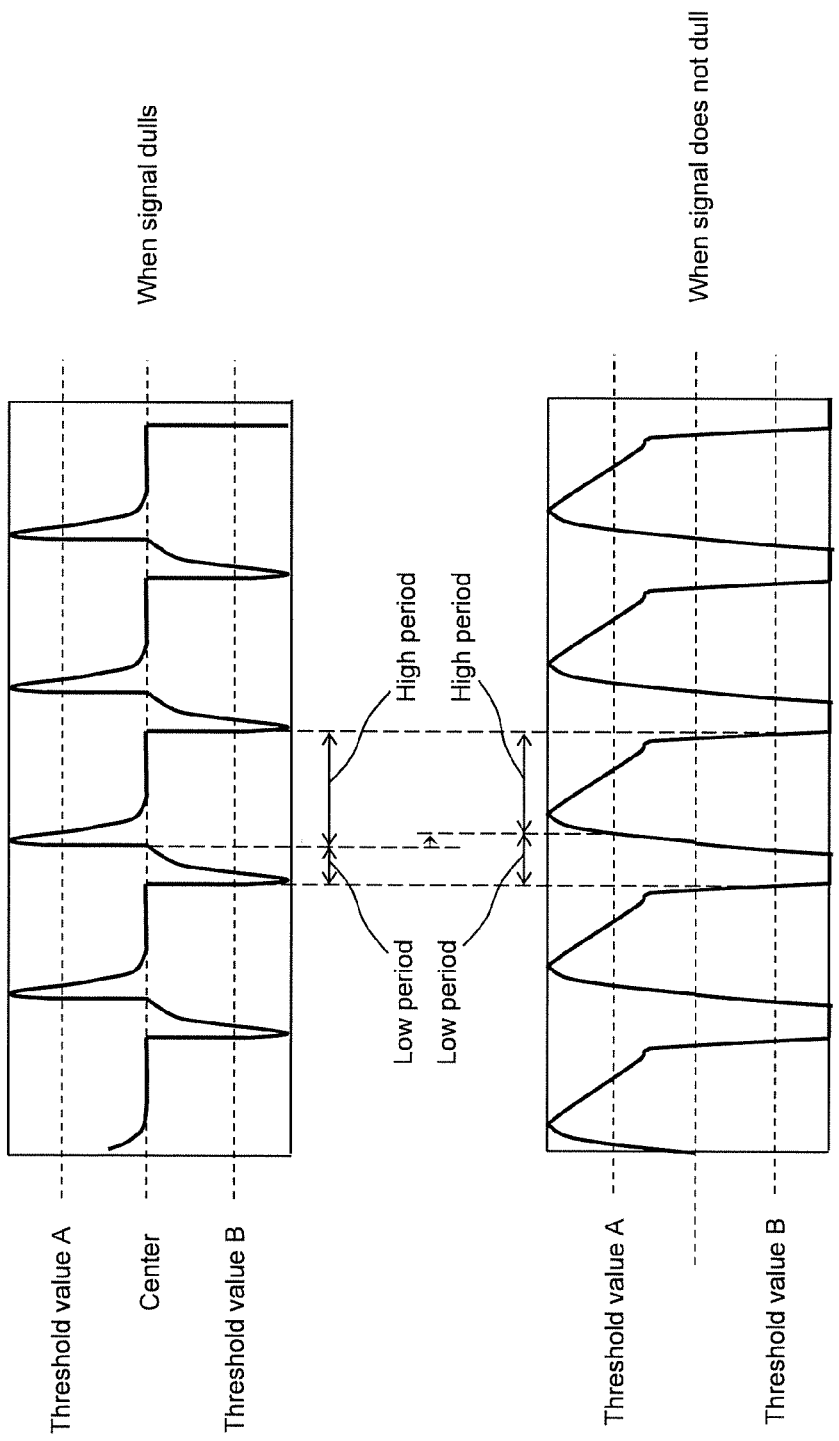
FIG. 8 is a waveform diagram illustrating comparison between a high period and a low period to determine a logical value for an ADC input waveform based on whether or not the signal is dull.

FIG. 8 illustrates comparison between the high period and the low period in order to determine a logical value for the input waveform to the ADC 123 according to whether or not a signal is dull. An example method of determining the high period and the low period of an electric signal is to measure a difference between a signal voltage over threshold value A and a signal voltage below threshold value B. However, this method cannot measure a correct period when the upward waveform amplitude (positive polarity side against the center) differs from the downward waveform amplitude (negative polarity side against the center). As illustrated in FIG. 8, a dull waveform causes the measurement to shorten the high period and lengthen the low period. The demodulation portion 122 identifies threshold values A and B or measures the high period and the low period based on a conversion result from the ADC 123.

Figure 9:
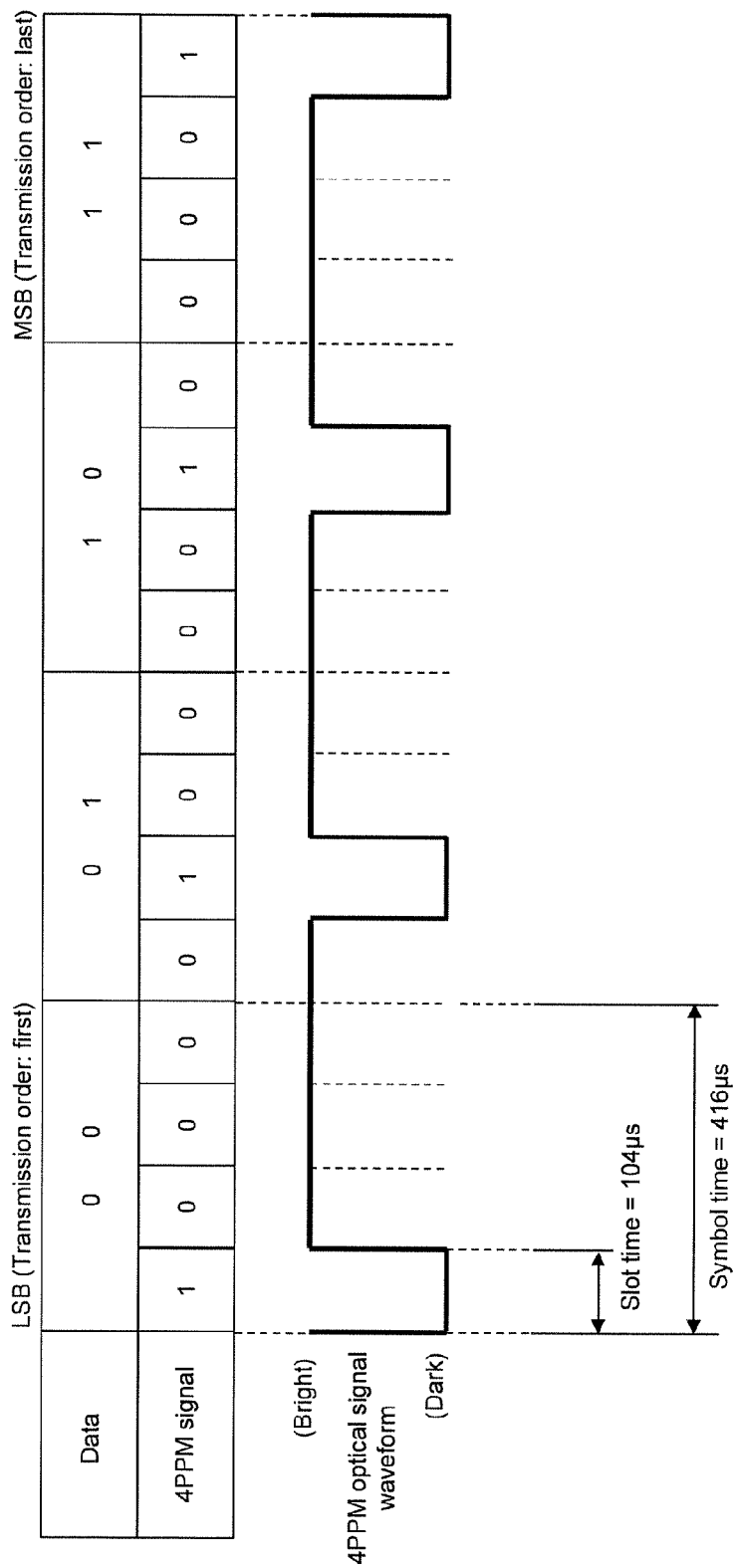
FIG. 9 is an explanatory diagram illustrating a 4 PPM system compliant with JEITA CP-1223, a communication standard using visible light.

Communication standards using visible light include EITA CP-1223 (visible light beacon system), for example. As illustrated in FIG. 9, a 4 PPM system divides a specified time defined as a symbol time into four slots. The system permits a pulse corresponding to one slot time per symbol time. The system performs optical communication using 2-bit information allocated to the slot corresponding to the available pulse. If a signal waveform is dull as described above, the demodulation portion 122 may cause an error in the measured time for the high period and the low period with reference to the slot time (104 μs) defined in the standard.

Correcting a Dull Signal Waveform

Figure 10:
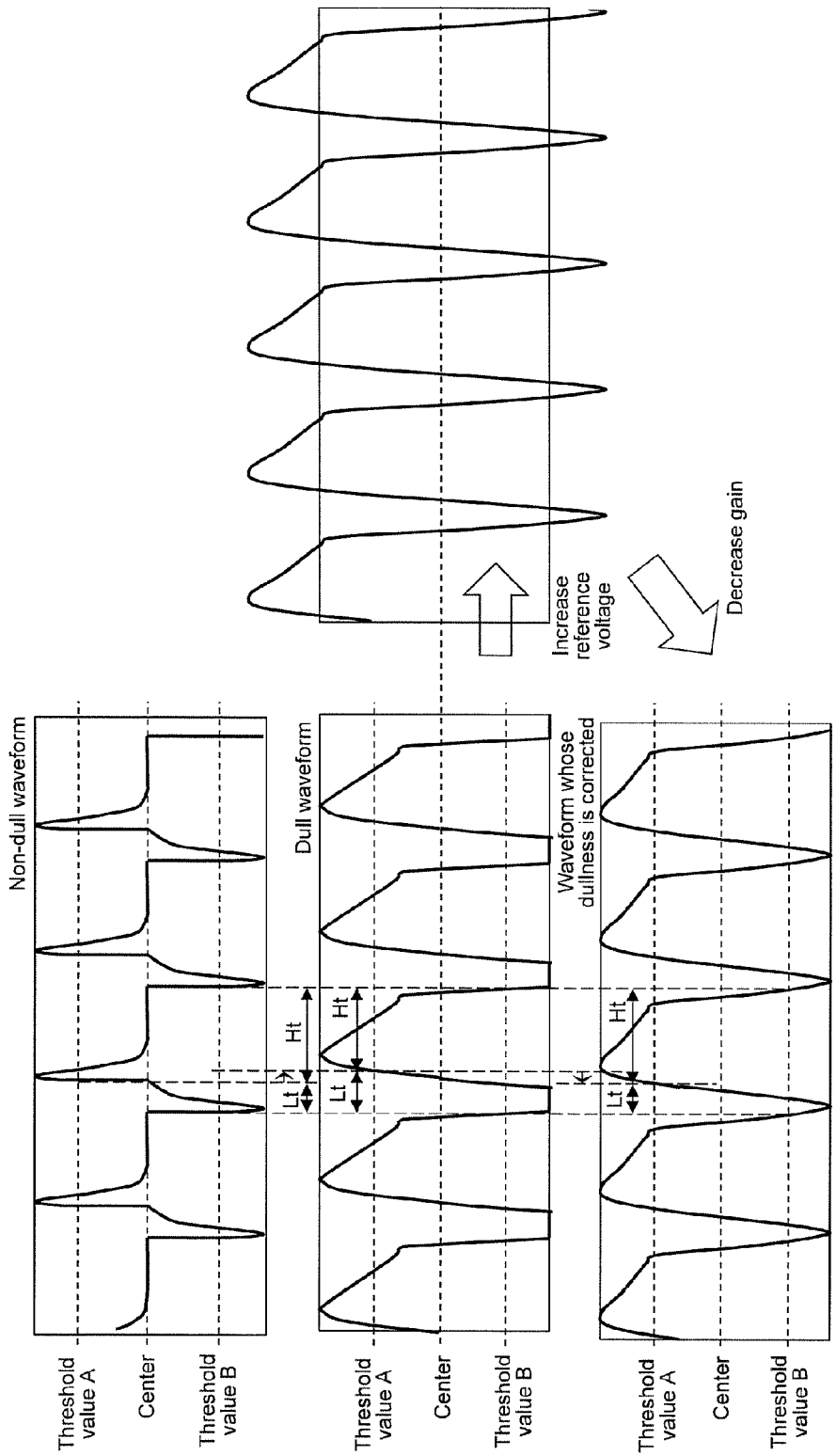
FIG. 10 is a waveform diagram illustrating a correction principle to correct a dull signal waveform as a countermeasure against a dull signal.

A countermeasure against signal dullness is to correct a dull signal waveform. FIG. 10 illustrates a correction principle. The control circuit 120 determines whether or not the waveform signal WV2 output from the second waveform generation circuit 15 contains an unnecessarily dull signal waveform. When determining that the signal waveform is unnecessarily dull, the control circuit 120 performs control to set the reference voltage VB2 for the second high-pass filter 106 and the second variable gain amplifier 107 in the second waveform generation circuit 15 to be higher than at present. In addition, the control circuit 120 performs control to set the gain of the second variable gain amplifier 107 in the second waveform generation circuit 15 to be smaller than at present. Setting the reference voltage VB2 to be higher than at present allows the amplitude for the positive polarity and the amplitude for the negative polarity to be approximately equal. Later setting the gain to be smaller than at present allows the signal waveform to fit into a dynamic range of the ADC 123. As a result, the high period and the low period can be correctly identified similarly to a case where the waveform is not dull. The demodulation portion 122 hardly incorrectly determines a received signal even if a dark optical signal dulls an output signal from the light receiving element 102. The signal control portion 120 performs this control based on conversion data from the ADC 123. In FIG. 10, Ht denotes a correct high period, Lt denotes a correct low period, Hf denotes an incorrect high period, and Lf denotes an incorrect low period.

Automatic Gain Control

As described above, a dull signal waveform is corrected as needed while the automatic gain control is performed for the first variable gain amplifier 104 and the second variable gain amplifier 107. The automatic gain control technique will be described first.

Figure 11:
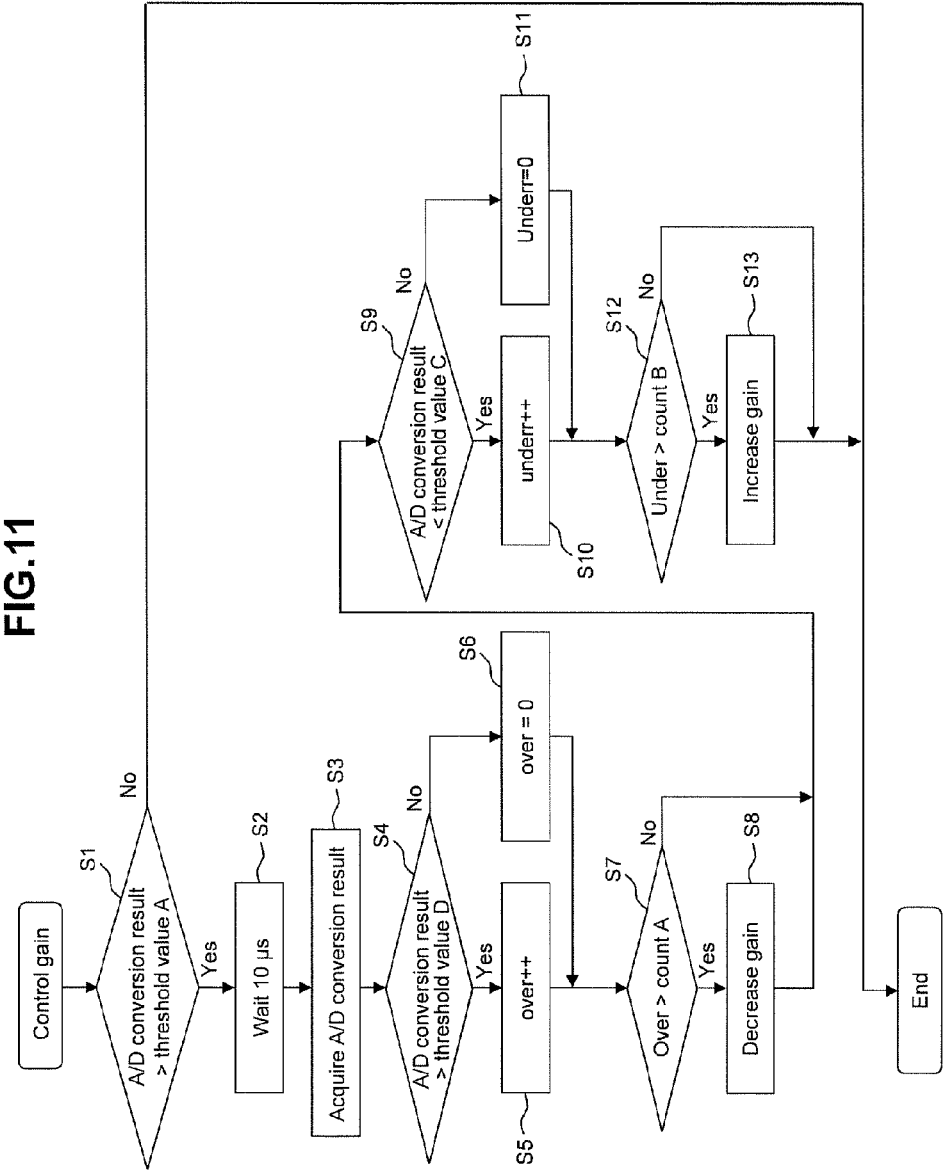
FIG. 11 is a flowchart illustrating an automatic gain control method.
Figure 12:
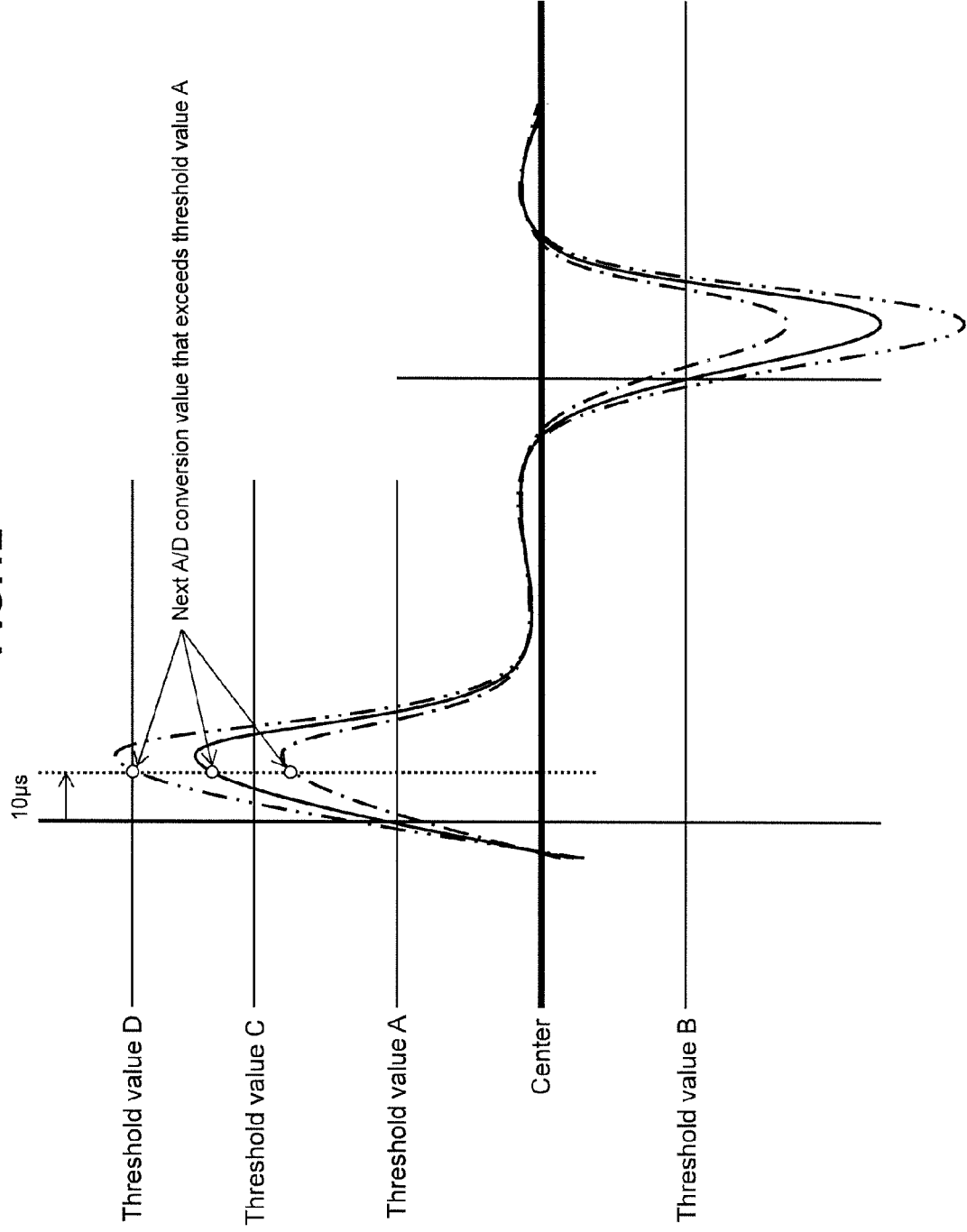
FIG. 12 is an explanatory diagram containing a waveform diagram illustrating waveform signals and determination threshold values based on the automatic gain control.

FIG. 11 illustrates a method of the automatic gain control. The ADC 13 successively converts the supplied waveform signal WV2 from an analog signal into a digital signal to generate A/D conversion data. The demodulation portion 122 compares the A/D conversion data with threshold values A and B in FIG. 12 and measures the high period and the low period described above to perform modulation according to the 4 PPM system. The signal control portion 120 compares the A/D conversion data with threshold values A, C, and D in FIG. 12 to perform the automatic gain control and the bias voltage control.

The signal control portion 120 determines whether or not the A/D conversion data exceeds threshold value A (S1). If the A/D conversion data exceeds threshold value A, the signal control portion 120 enters the automatic gain control flow. The signal control portion 120 waits until a lapse of 10 μs, for example, after the A/D conversion data exceeds threshold value A (S2). The signal control portion 120 acquires the A/D conversion data (S3). The signal control portion 120 determines whether or not the A/D conversion data exceeds threshold value D (S4). If the A/D conversion data exceeds threshold value D, the signal control portion 120 increments an over-counter (over) by one (S5). If the A/D conversion data does not exceed threshold value D, the signal control portion 120 initializes the over-counter (over) to value 0 (S6). The signal control portion 120 determines whether or not a value of the over-counter (over) exceeds count A (S7). The signal control portion 120 decreases the gain only when the value of the over-counter (over) exceeds count A (S8). The signal control portion 120 determines whether or not the A/D conversion data acquired at S3 is smaller than threshold value C (S9). If the A/D conversion data is smaller than threshold value C, the signal control portion 120 increments an under-counter (under) by one (S10). If the A/D conversion data is not smaller than threshold value C, the signal control portion 120 initializes the under-counter (under) to value 0 (S11). The signal control portion 120 determines whether or not a value of the under-counter (under) exceeds count B (S12). The signal control portion 120 increases the gain only when the value of the under-counter (under) exceeds count B (S13). The automatic gain control is thus performed so that the peak of the waveform signal WV2 is positioned between threshold values C and D. The signal control portion 120 performs the gain control and supplies control signals GD1 and GD2 to the variable gain amplifiers 104 and 107. The wait time of 10 μs at S2 exemplifies the time elapsed from threshold value A to the waveform peak.

The waveform signal WV2 is assumed to be normal when the amplitude at the positive polarity side equals the amplitude at the negative polarity side around the bias voltage. Only the positive polarity side is taken into consideration. The above-mentioned automatic gain control can be performed so that the waveform peak converges between threshold values C and D. In particular, the gains of the variable gain amplifiers 104 and 107 are changed when the waveform peak successively exceeds threshold value D or falls short of threshold value C. It is possible to relatively easily prevent the control convergence from degrading due to excessive changes in the gain. The process flow starts only when the waveform signal exceeds threshold value A. This enables to save a consumption current when the waveform signal does not exceed threshold value A. The process at S1 may be provided as a subroutine or a condition to determine an interrupt occurrence. The process after the condition is satisfied may be embodied as a subroutine or an interrupt process.

The automatic gain control has been described while focusing on the case where the waveform signal exceeds threshold value A. However, the present invention is also applicable to a case where a waveform signal value falls short of threshold value B. A process focusing on threshold values A and B improves accuracy of the gain control but increases the power consumption. As described with reference to FIG. 7, the amplitude of an input waveform to the ADC 123 symmetrically converges around the center when the waveform is not dull. In consideration of this, there may be practically no problem with the automatic gain control focusing only on threshold value A at the positive polarity side.

Technique of Determining Whether or not a Signal Waveform is Dull

When a signal waveform dulls, the amount of increasing the reference voltage VB2 depends on how much an output signal from the light receiving element 102 dulls. The output signal hardly dulls under a bright condition. The output signal easily dulls under a dark condition. An output voltage level of the light receiving element 102 is used to determine whether or not the signal dulls. The output voltage level of the light receiving element 102 increases under a bright condition and decreases under a dark condition. The reference voltage VB2 is controlled according to the gain of the second variable gain amplifier 107. However, the gain of the second variable gain amplifier 107 may need to be increased even under a bright condition. For example, there may be case where an output from the light receiving element 102 saturates. When an output voltage in the high period saturates, further increasing the brightness also approximates an output voltage in the low period to a saturated voltage. This decreases a difference between the output voltage in the high period and the output voltage in the low period. In such a case, an output voltage from the high-pass filter 103 decreases. The gain of the variable gain amplifier 107 needs to be increased. Therefore, it is necessary to determine whether the gain is increased because of a bright condition (to increase the gain of the variable gain amplifier 107 due to a saturated output from the light receiving element 102) or because of a dark condition (to increase the gain of the variable gain amplifier 107 due to a dull output signal from the light receiving element 102). The reference voltage BV2 needs to be increased only under a dark condition.

Figure 13:
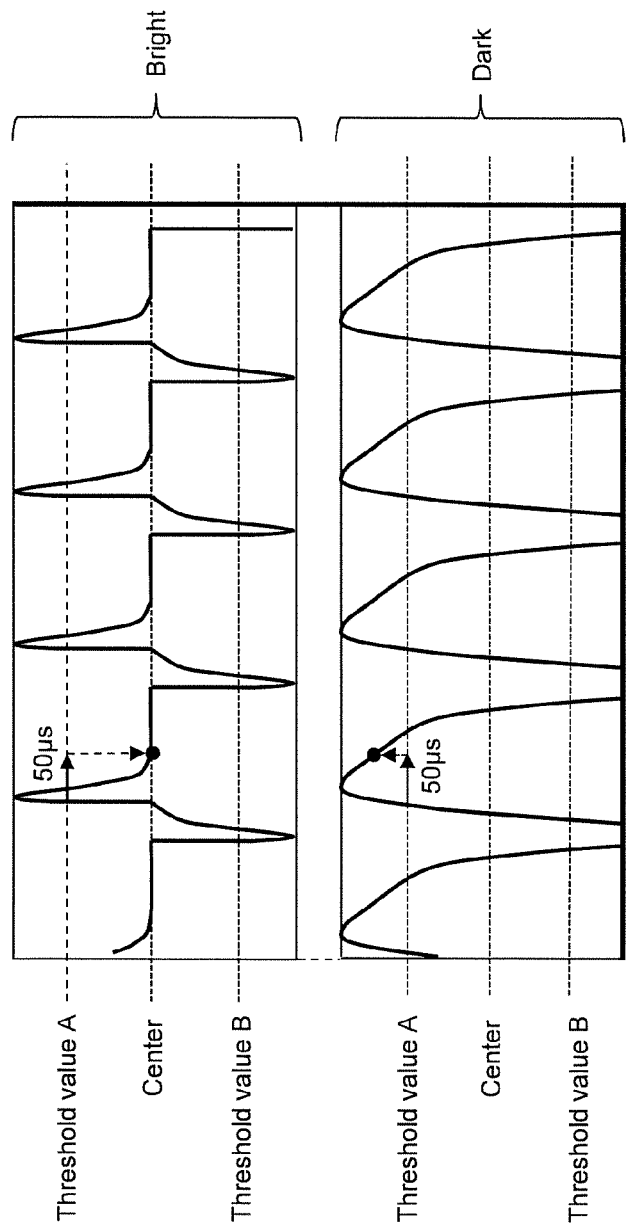
FIG. 13 is a waveform diagram illustrating waveform signals corresponding to a bright optical signal and a dark optical signal that increase the gain.

FIG. 13 illustrates different waveforms of the waveform signal WV2 depending on whether the gain is increased due to a bright condition or a dark condition. In consideration of the differences, it is possible to determine that a dark condition occurs and the waveform of the light receiving element 102 dulls when a signal level exceeds a specified voltage 50 as after the signal exceeds threshold value A. It is possible to determine that a bright condition occurs and the waveform of the light receiving element 102 does not dull when the signal level falls short of the specified voltage. The time of 50 μs, though not limited thereto, is illustratively settled to make a distinction between bright and dark conditions in consideration of the relation to the slot time (104 μs) illustrated in FIG. 9.

Controlling the Reference Voltage VB2 Against a Dull Signal Waveform

Figure 14:
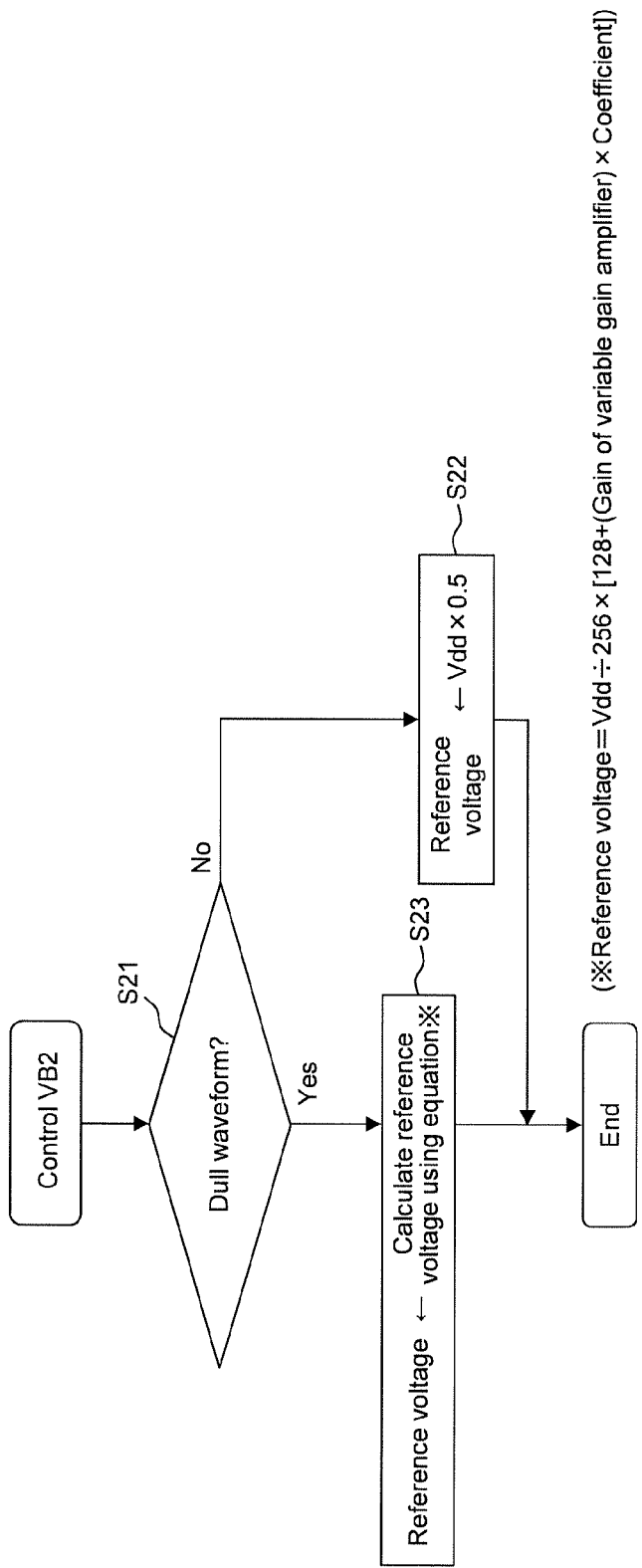
FIG. 14 is a flowchart illustrating a procedure to control reference voltage VB2 against a dull waveform signal.

FIG. 14 illustrates a procedure to control the reference voltage VB2 when the waveform signal WV2 dulls. The signal control portion 120 may determine that the waveform of the waveform signal WV2 does not unnecessarily dull (S21). In this case, the signal control portion 120 assumes the second reference voltage BV2 as the bias voltage in the second waveform generation circuit to be a first voltage, for example, half of power-supply voltage Vdd (S22). The signal control portion 120 may determine that the waveform of the waveform signal WV2 unnecessarily dulls. In this case, the signal control portion 120 assumes the second reference voltage BV2 as the bias voltage in the second waveform generation circuit to be a second voltage resulting from increasing the first voltage (Vdd/2) by a voltage corresponding to a ratio of the present gain to the maximum gain in the second variable gain amplifier 107 (S23). For example, the second voltage is found as:

$$\text{Second voltage} = Vdd \times \{128 + (n \times \alpha)\}/256$$

where n denotes the present gain in relation to maximum gain 256 of the second variable gain amplifier 107 and α denotes an appropriate coefficient.

The second voltage results from increasing the first voltage (Vdd/2) by a voltage corresponding to a ratio of the present gain to the maximum gain in the second variable gain amplifier 107. The signal control portion 120 controls the second voltage in relation to the second reference voltage BV2 based on control signal VD2.

According to the above-mentioned control of the reference voltage VB2, the degree of a difference in amplitudes of the second waveform signal WV2 at the positive polarity side and the negative polarity side correlates to the gain under the automatic gain control with reference to the variable gain amplifier 107. In consideration of this, it is possible to settle a decrease in the second voltage with reference to the first voltage in a correlation with the present gain. It is also possible to contribute to optimizing the second voltage in order to decrease the gain of the second waveform signal WV2.

Process to Correct a Dull Signal Waveform

The signal control portion 120 may detect dullness of the waveform signal WV2 using the technique described based on FIG. 13. In this case, the signal control portion 120 uses the method described at S22 shown in FIG. 14 to increase the second threshold voltage VB2 and raise the voltage level of the signal waveform WV2 (see FIG. 10). When the signal waveform WV2 is raised, the above-mentioned automatic gain control decreases the gain so that the waveform peak fits between threshold values C and D illustrated in FIG. 10. As illustrated in FIG. 10, the result is to acquire the waveform signal WV2 whose distortion is corrected. However, the condition at S7 needs to be satisfied when the automatic gain control in FIG. 11 performs a process that raises the threshold voltage and thereafter decreases the gain. There is a possibility of delaying a response of the process that decreases the gain. To avoid this possibility, the process at S8 to decrease the gain just needs to be performed separately from the control flow in FIG. 11 immediately after the threshold voltage VB2 is adjusted as described above.

Correcting a dull signal waveform as described above enables to alleviate a difference in amplitudes at the positive polarity side and the negative polarity side of the second waveform signal WV2. It is possible to prevent positive and negative bit widths for the second waveform signal WV2 from deviating from specified widths. It is also possible to reduce a possibility of incorrect determination about a logical value in relation to the second waveform signal WV2. Therefore, the optical receiver 10 can correctly receive data based on an optical signal even if the light receiving element 102 receives a weak optical signal. As an experimental result, for example, the above-mentioned waveform correction improves the data reception capability from the illuminance down to 36 lux to the illuminance down to 26 lux. Namely, data can be received even at the illuminance that is reduced 27% from 36 lux.

Figure 15:
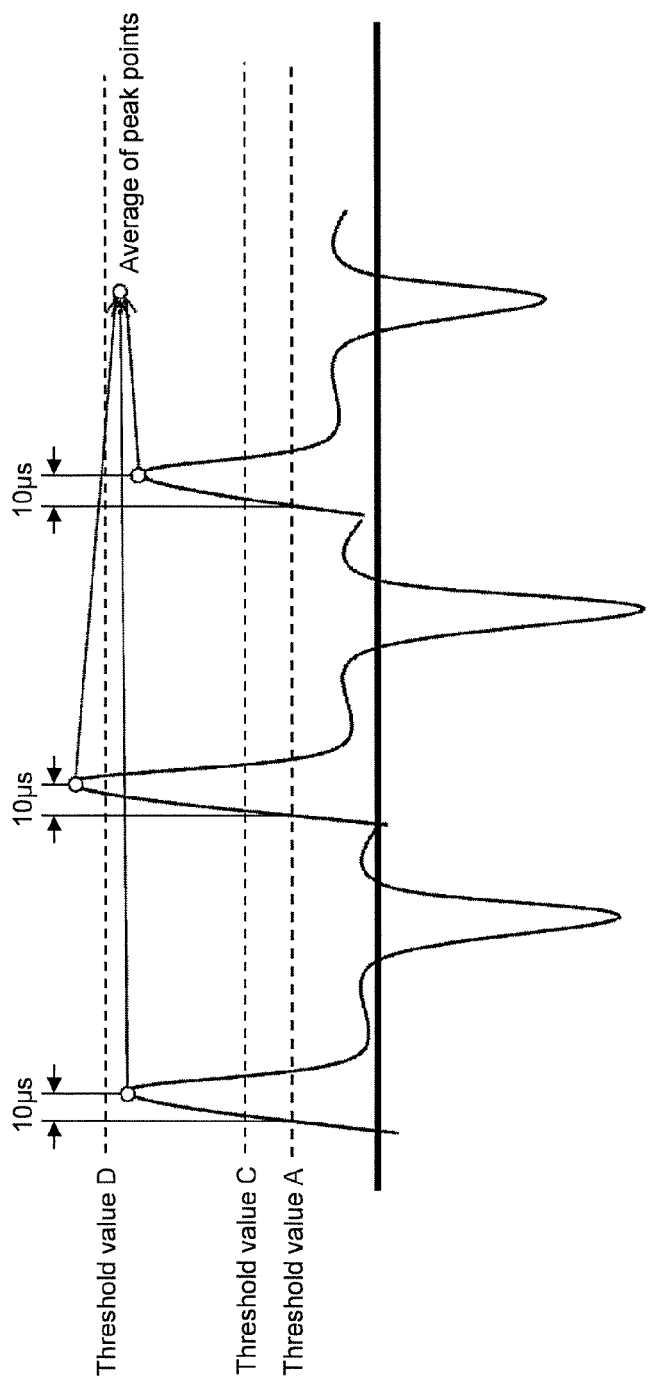
FIG. 15 is a waveform diagram illustrating another technique of the automatic gain control over the variable gain amplifier.
Figure 16:
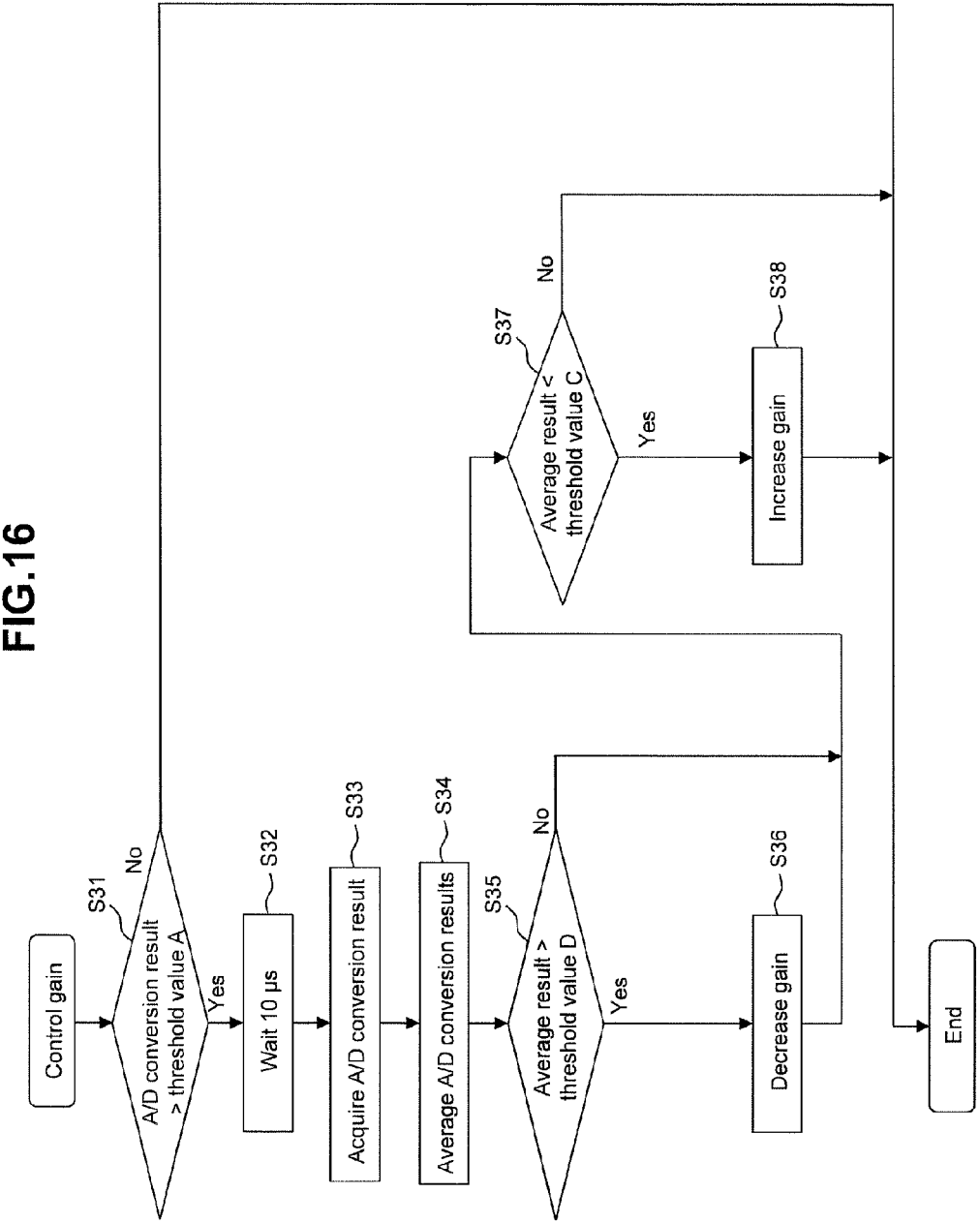
FIG. 16 is a flowchart illustrating the technique in FIG. 15.

Gain Control of the Variable Gain Amplifier Using an Average Value of Peak Values FIG. 15 is a waveform diagram illustrating another technique of the automatic gain control for the variable gain amplifiers 104 and 107. FIG. 16 is a control flow illustrating the technique performed by the signal control portion.

The signal control portion 120 determines whether or not the A/D conversion data exceeds threshold value A (S31). If the A/D conversion data exceeds threshold value A, the signal control portion 120 enters the automatic gain control flow. The signal control portion 120 waits until a lapse of 10 μs, for example, after the A/D conversion data exceeds threshold value A (S32). The signal control portion 120 acquires the A/D conversion data (S33). For example, as illustrated in FIG. 15, the signal control portion 120 calculates an average value for three pieces of data acquired in the past including the presently acquired data (S34). The signal control portion 120 determines whether or not the average value exceeds threshold value D (S35). The signal control portion 120 decreases the gain of the second variable gain amplifier 107 if the average value exceeds threshold value D (S36). The signal control portion 120 determines whether or not the average value falls short of threshold value C (S37). The signal control portion 120 increases the gain of the second variable gain amplifier 107 if the average value falls short of threshold value C (S38).

The automatic gain control is performed so that the peak of the waveform signal WV2 fits between threshold values C and D. The signal control portion 120 performs the gain control and supplies the control signals GD1 and GD2 to the variable gain amplifiers 104 and 107. This technique also relatively easily enables to prevent the control convergence from degrading due to excessive automatic gain control similarly to the above-mentioned technique.

Figure 17:
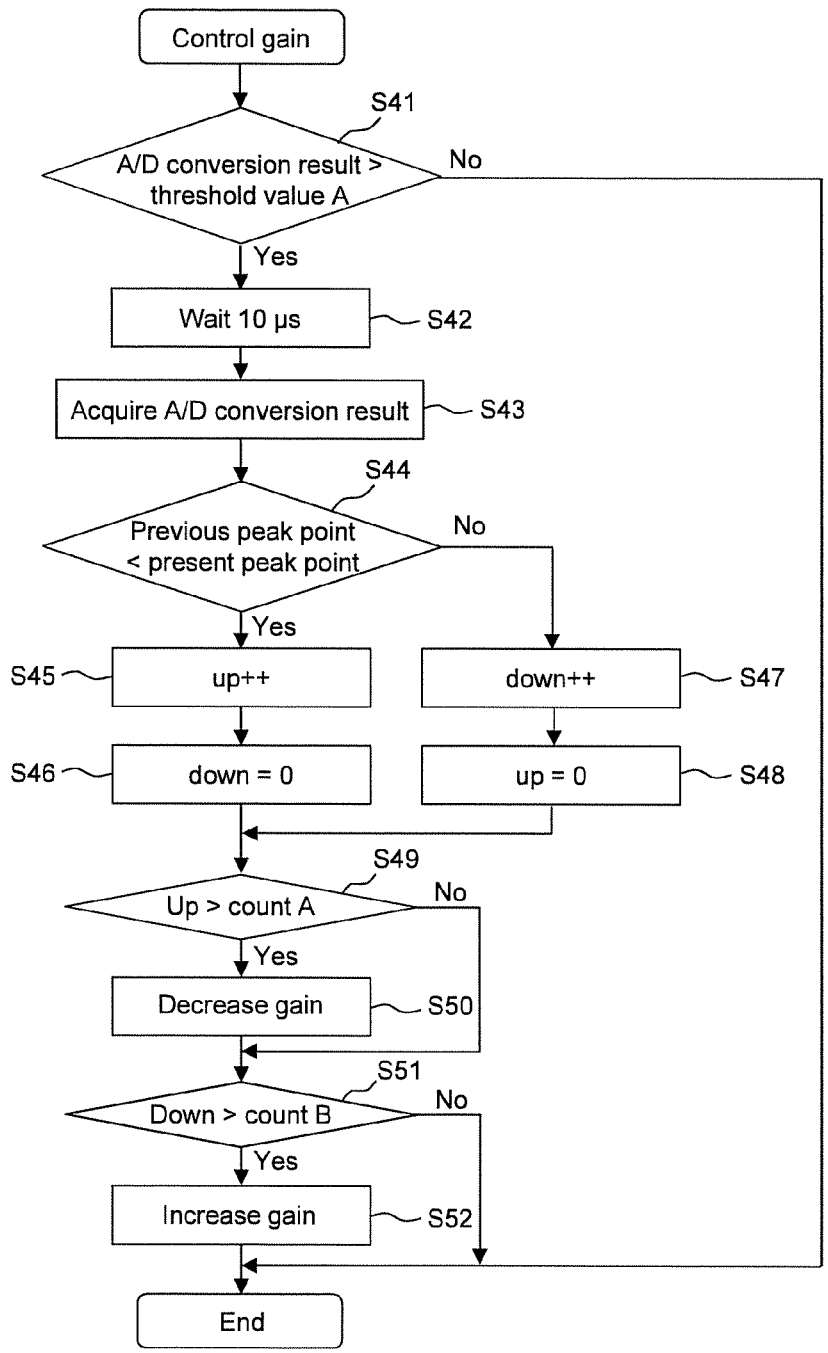
FIG. 17 is a flowchart illustrating a gain control method for the variable gain amplifier according to a tendency to increase or decrease a peak value in order to provide still another control flow of the automatic gain control over the variable gain amplifier.

Controlling a Gain of the Variable Gain Amplifier According to a Tendency of Increasing or Decreasing Peak Values FIG. 17 is another control flow illustrating the automatic gain control for the variable gain amplifiers 104 and 107.

The signal control portion 120 determines whether or not the A/D conversion data exceeds threshold value A (S41). If the A/D conversion data exceeds threshold value A, the signal control portion 120 enters the automatic gain control flow. The signal control portion 120 waits until a lapse of 10 μs, for example, after the A/D conversion data exceeds threshold value A (S42). The signal control portion 120 acquires the A/D conversion data (S43). The signal control portion 120 determines a magnitude relationship between the presently acquired A/D conversion data (present waveform peak value) and the previously acquired A/D conversion data (previous waveform peak value) (S44). If the waveform peak value for the waveform signal tends to increase, the signal control portion 120 increments the first counter (up) by one (S45) and initializes the count value of the second counter (down) (S46). If the waveform peak value for the waveform signal tends to decrease, the signal control portion 120 increments the second counter (down) by one and initializes the count value of the first counter (up) (S48). The signal control portion 120 performs the gain control as follows. When the count value of the first counter (up) exceeds count A as a first value, the signal control portion 120 decreases the gains of the variable gain amplifiers 104 and 107 (S49 and S50). When the count value of the second counter (down) exceeds count B as a second value, the signal control portion 120 increases the gains of the variable gain amplifiers 104 and 107 (S51 and S52). The state in which the count value of the first counter (up) exceeds count A corresponds to the state in which the continuously increasing peak value of the waveform signal WV2 exceeds threshold value D in FIG. 12. The state in which the count value of the second counter (down) exceeds count B corresponds to the state in which the continuously decreasing peak value of the waveform signal WV2 falls short of threshold value C in FIG. 12.

The automatic gain control is performed so that the peak of the waveform signal WV2 fits between threshold values C and D. The signal control portion 120 performs the gain control and supplies the control signals GD1 and GD2 to the variable gain amplifiers 104 and 107. This technique also relatively easily enables to prevent the control convergence from degrading due to excessive automatic gain control similarly to the above-mentioned technique.

Changing the Determination Threshold Value for Logical Values when a Waveform Dulls In addition to the technique that corrects a waveform signal based on the signal dullness due to a dark optical signal, there may be a technique that allows the signal control portion 120 or the demodulation portion 122 to change determination threshold values for the high period and the low period based on waveform dullness. Such a corrective technique will be described with reference to a waveform diagram in FIG. 18 and a control flow in FIG. 19.

Figure 18:
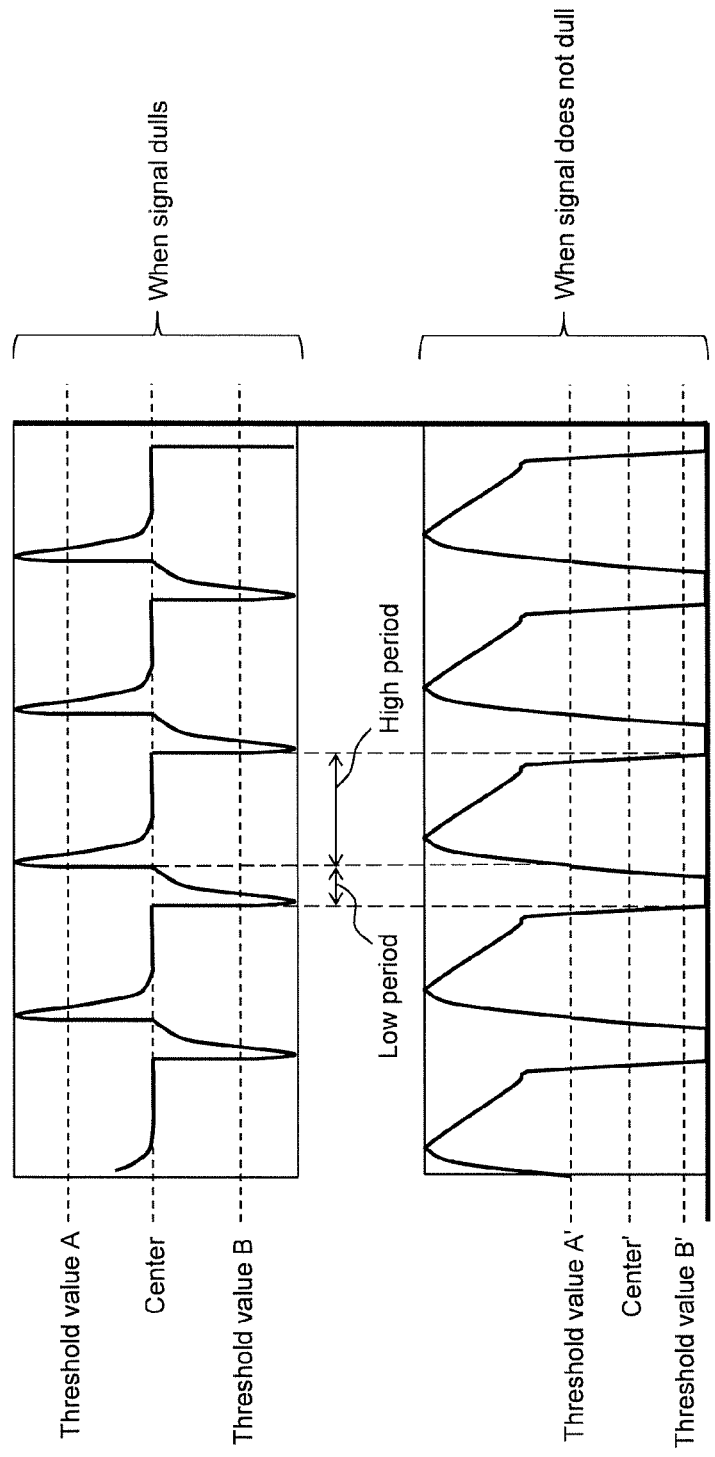
FIG. 18 is a waveform diagram illustrating changes of threshold values for the high period and the low period according to the waveform dullness.

The signal control portion 120 controls determination threshold values as illustrated in FIG. 18, for example. When the waveform signal WV2 does not dull, the signal control portion 120 assumes threshold value A to be defined as a determination threshold value at the voltage side higher than determination full-scale voltage Vdd and assumes threshold value B to be defined as a determination threshold value at the voltage side lower than determination full-scale voltage Vdd in order to distinguish between the low period and the high period of the waveform signal WV2. When the waveform signal WV2 dulls, the signal control portion 120 changes threshold value A to A' and threshold value B to B' so as to acquire the same low period and high period as those available when the waveform signal WV2 does not dull.

Figure 19:
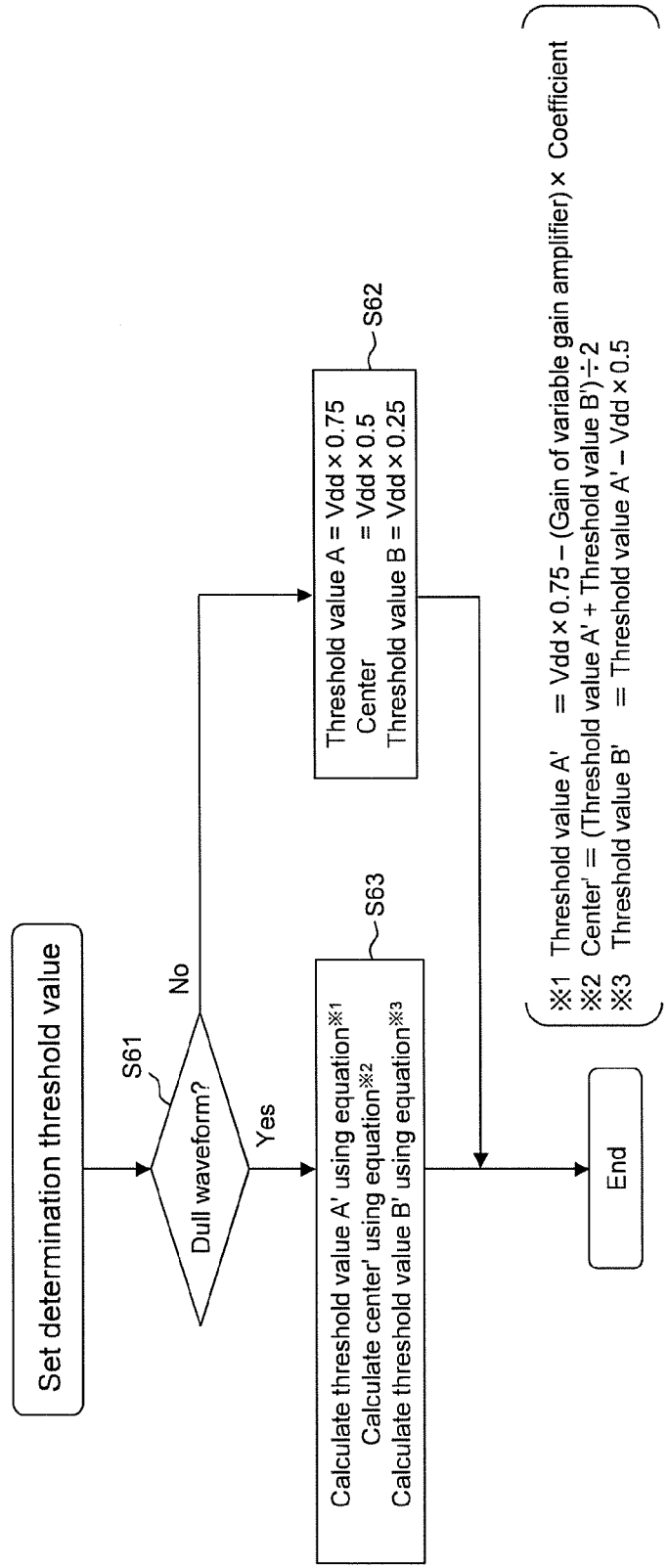
FIG. 19 is a flowchart illustrating a process to change threshold values according to the technique illustrated in FIG. 18.

To set the determination threshold values, the signal control portion 120 determines whether or not the waveform signal WV2 dulls (S61) as seen from the flowchart illustrated in FIG. 19. The method described with reference to FIG. 13 may be used for the determination.

If the waveform signal WV2 does not dull, the signal control portion 120 uses determination full-scale voltage Vdd to set the center to Vdd×0.5, set threshold value A as a determination criterion for the higher voltage side to Vdd× 0.75, and set threshold value B as a determination criterion for the lower voltage side to Vdd×0.25 (S62).

If the waveform signal WV2 dulls, the signal control portion 120 uses threshold value A' as a determination criterion for the voltage side higher than determination full-scale voltage Vdd and sets threshold value A' to a voltage lower than threshold value A by a voltage resulting from multiplying the present gain of the second variable gain amplifier 107 by specified coefficient β. The signal control portion 120 uses threshold value B' as a determination criterion for the voltage side lower than determination full-scale voltage Vdd and sets threshold value B' to a voltage lower than threshold value A' by a voltage (Vdd× 0.5) intermediate between threshold values A and B (S62). In this case, a center voltage (center') is assumed to be an average of threshold voltages A' and B' (S62). The values are calculated as follows.

Threshold value $A'=Vdd\times0.75-\text{gain of the variable gain amplifier } 107\times\beta$ Center'=(threshold value $A'$+threshold value $B'$)/2

Threshold value $B'$=threshold value $A'-Vdd\times0.5$

When the light receiving element 102 may receive a weak optical signal, the waveform signal WV2 dulls to cause a difference between amplitudes at the positive polarity side and the negative polarity side. In such a case, the control circuit 12 accordingly changes a determination threshold value for the waveform signal WV2. The amount of a change in the determination threshold value is comparable to a voltage resulting from multiplying the present gain of the variable gain amplifier 107 by specified coefficient β. This is because the degree of a difference in amplitudes at the positive polarity side and the negative polarity side for the waveform signal WV2 correlates with the gain of the automatic gain control in the second variable gain amplifier 107. It is possible to avoid an excessive change in the determination threshold value or, in other words, contribute to optimizing the determination threshold value to be changed.

It is difficult to tell which is better between the technique to correct the waveform signal and the technique to change the determination threshold value. How much the determination threshold value should be changed controls the success of the technique to change the determination threshold value. We obtained an experimental result of improving the reception capability from the illuminance down to 36 lux to the illuminance down to 16 lux using an appropriate degree of change. Many experiments may be needed to achieve such an appropriate degree of change. The technique to correct a waveform signal need to optimize an increase in the bias voltage (threshold voltage) and a decrease in the variable gain amplifier gain. The bias voltage (threshold voltage) and the variable gain amplifier gain need to be adjusted, increasing an adjustment allowance. The optimization is considered to be relatively easy.

Optical Receiver that Includes an Acceleration Sensor and Receives Position Information Using an Optical Signal As illustrated in FIG. 1, the optical receiver 10 includes the acceleration sensor 13 and the power supply switch 101 that selects power supply to the light receiving element 102. In a mode to receive position information using an optical signal, the control circuit 12 turns on the power supply switch 101 based on an output from the acceleration sensor 13 only while the movement of the optical receiver 10 is sensed. As illustrated in FIG. 3, for example, many LED lighting apparatuses 30 are installed in an underground mall or a department store. The optical transmitter 20 included in the LED lighting apparatus 30 outputs position information about where the lighting apparatus 30 is installed. The position information includes the latitude, the longitude, and the number of stories (height) of a building. The optical receiver 10 can receive the current position under an indoor environment where the GPS (Global Positioning System) is unavailable. The light receiving element 102 can receive an optical signal only when the optical receiver 10 moves. The light receiving element 102 is activated only when the received position information needs to be updated. It is possible to greatly reduce the power consumption when the optical receiver 10 does not move.

Obviously, a mode register setting enables selection of a mode that turns on the power supply switch regardless of the detection state of the acceleration sensor when an optical signal is used to receive the position information.

It is to be distinctly understood that the present invention is not limited to the above-mentioned embodiment but may be otherwise variously embodied within the spirit and scope of the invention.

For example, the optical receiver is not limited to an application to the mobile terminal 1. The optical receiver is widely applicable to the other electronic devices and vehicles.

The specific configuration of the waveform generation circuit 11 is not limited to the example in FIG. 1 but can be changed appropriately. For example, the high-pass filter may receive an output from the light receiving element and amplify the output based on a variable gain. The low-pass filter may receive the amplified output. The variable gain amplifier may amplify this output to generate a waveform signal. In this case, the bias voltage of the low-pass filter needs to be adjusted. Various other functional modifications are available.

What is claimed is:

1. An optical receiver comprising:
    a light receiving element that receives an optical signal and converts the optical signal into an electric signal;
    a first waveform generation circuit that is supplied with an electric signal output from the light receiving element and generates a first waveform signal based on filtering and amplification;
    a second waveform generation circuit that is supplied with the first waveform signal output from the first waveform generation circuit and generates a second waveform signal based on filtering and amplification; and
    a control circuit that performs bias voltage control and automatic gain control for the first waveform generation circuit and the second waveform generation circuit,
    wherein the control circuit determines whether or not a second waveform signal output from the second waveform generation circuit indicates an unnecessarily dull signal waveform and, when the signal waveform is determined to be unnecessarily dull, performs control to increase a bias voltage in the second waveform generation circuit to be higher than at present and decrease a gain in the second waveform generation circuit to be smaller than at present.

2. The optical receiver according to claim 1,
wherein the control circuit determines whether or not a second waveform signal output from the second waveform generation circuit maintains a state of exceeding a logical value determination threshold value for a specified time period shorter than a determination-slot time,
wherein, when the state is maintained for the specified time period, the control circuit determines that the second waveform signal contains an unnecessarily dull waveform, and
wherein, when the state is not maintained for the specified time period, the control circuit determines that the second waveform signal does not contain an unnecessarily dull waveform.

3. The optical receiver according to claim 2,
wherein, when determining that a waveform of the second waveform signal does not unnecessarily dull, the control circuit uses a bias voltage in the second waveform generation circuit as a first voltage, and
wherein, when determining that a waveform of the second waveform signal unnecessarily dulls, the control circuit assumes a bias voltage in the second waveform generation circuit to be a second voltage resulting from increasing the first voltage by a voltage corresponding to a ratio of a present gain to a maximum gain in the second waveform generation circuit.

4. The optical receiver according to claim 1
wherein, when a value for a second waveform signal output from the second waveform generation circuit may exceed a specified logical value determination threshold value, the control circuit waits until a specified time shorter than a determination-slot time for logical value determination elapses from timing to determine the logical value and acquires the value for the second waveform signal,
wherein the control circuit determines whether or not a value for the acquired second waveform signal exceeds a first threshold value, and when the value does not exceed the first threshold value, the control circuit initializes a first counter, and when the value exceeds the first threshold value, the control circuit increments the first counter by one, and when a count value of the incremented first counter exceeds a first value, the control circuit decreases a gain of the second waveform generation circuit, and
wherein the control circuit determines whether or not the acquired value for the second waveform signal exceeds a second threshold value lower than the first threshold value, and when the value exceeds the second threshold value, the control circuit initializes a second counter, and when the value falls short of the second threshold value, the control circuit increments the second counter by one, and when a count value of the second counter exceeds a second value, the control circuit performs gain control to increase a gain of the second waveform generation circuit.

5. The optical receiver according to claim 4,
wherein the control circuit determines whether or not a second waveform signal output from the second waveform generation circuit maintains a state exceeding a logical value determination threshold value for a specified time period shorter than a determination-slot time,
wherein, when the state is not maintained for the specified time period, the control circuit determines that the second waveform signal does not indicate an unnecessarily dull waveform and uses a bias voltage of the second waveform generation circuit as a first voltage, and
wherein, when the state is maintained for the specified time period, the control circuit determines that a waveform of the second waveform signal unnecessarily dulls and assumes a bias voltage in the second waveform generation circuit to be a second voltage resulting from increasing the first voltage by a voltage corresponding to a ratio of a present gain to a maximum gain in the second waveform generation circuit.

6. The optical receiver according to claim 1,
wherein the first waveform generation circuit includes:
a first high-pass filter that is supplied with an electric signal output from the light receiving element and emphasizes a changed edge of the signal;
a first variable gain amplifier that amplifies an output from the first high-pass filter using a variable gain;
a low-pass filter that is supplied with an output from the variable gain amplifier, removes a noise of high-frequency components, and outputs the first waveform signal; and
a first reference voltage generator that generates a reference voltage to specify a first bias voltage for output signal waveforms from the first high-pass filter, the first variable gain amplifier, and the low-pass filter.

7. The optical receiver according to claim 6,
wherein the second waveform generation circuit includes:
a second high-pass filter supplied with a first waveform signal output from the low-pass filter and emphasizes a changed edge of the signal;
a second variable gain amplifier that amplifies an output from the second high-pass filter using a variable gain; and
a second reference voltage generator that generates a reference voltage to specify a second bias voltage for output signal waveforms from the second high-pass filter and the second variable gain amplifier.

8. The optical receiver according to claim 1,
wherein, when a value for the second waveform signal output from the second waveform generation circuit exceeds a first logical value determination threshold value, the control circuit waits until a lapse of specified time shorter than a determination-slot time for logical value determination from timing to determine the logical value, acquires a value for the second waveform signal, and calculates an average value of a presently acquired value and one of one value and a plurality of values most recently acquired for the second waveform signal,
wherein, when the average value exceeds a first threshold value, the control circuit decreases a gain of the second waveform generation circuit, and
wherein, when the average value does not exceed a second threshold value lower than the first threshold value, the control circuit performs gain control to increase a gain of the second waveform generation circuit.

9. The optical receiver according to claim 1,
wherein, when a value for a second waveform signal output from the second waveform generation circuit exceeds a specified logical value determination threshold value, the control circuit waits until a lapse of specified time shorter than a determination-slot time for logical value determination from timing to determine the logical value and acquires a value for the second waveform signal and acquires a value for the second waveform signal, wherein the control circuit determines a magnitude relationship between the acquired value for the second waveform signal and a previously similarly acquired value for the second waveform signal, wherein, when a value for the second waveform signal tends to increase, the control circuit increments a first counter by one and initializes a value of a second counter, wherein, when a value for the second waveform signal tends to decrease, the control circuit increments a second counter by one and initializes a count value of a first counter, wherein, when a count value of the first counter exceeds a first value, the control circuit decreases a gain of the second waveform generation circuit, and wherein, when a count value of the second counter exceeds a second value, the control circuit increases a gain of the second waveform generation circuit.

10. An optical receiver comprising:
a light receiving element that receives an optical signal and converts the optical signal into an electric signal;
a waveform generation circuit that is supplied with an electric signal output from the light receiving element and generates a waveform signal based on filtering and amplification; and
a control circuit that performs bias voltage control and automatic gain control for the waveform generation circuit and performs control to determine a logical value for a waveform signal supplied from the waveform generation circuit in units of specified determination slots, wherein the control circuit determines whether or not a waveform signal output from the waveform generation circuit indicates an unnecessarily dull signal waveform, wherein, when the signal waveform is not unnecessarily dull, a first determination criterion at a voltage side higher than a determination full-scale voltage is set to a first threshold voltage and a second determination criterion at a voltage side lower than the determination full-scale voltage is set to a second threshold voltage, and wherein, when the signal waveform is unnecessarily dull, a third determination criterion at a voltage side higher than a determination full-scale voltage is set to a voltage lower than the first threshold voltage by a voltage resulting from multiplying a present gain of the waveform generation circuit and a specified coefficient together and a fourth determination criterion at a voltage side lower than a determination full-scale voltage is set to a voltage lower than a voltage corresponding to the third determination criterion by a voltage intermediate between the first threshold voltage and the second threshold voltage.

11. The optical receiver according to claim 10,
wherein, when a value for a waveform signal output from the waveform generation circuit exceeds a specified logical value determination threshold value, the control circuit waits until a lapse of specified time shorter than the determination-slot time for logical value determination from timing to determine the logical value and acquires a value for the waveform signal, wherein the control circuit determines whether or not the acquired value for the waveform signal exceeds a first threshold value, and when the value does not exceed the first threshold value, the control circuit initializes a first counter, and when the value exceeds the first threshold value, the control circuit increments the first counter by one, and when a count value of the incremented first counter exceeds a first value, the control circuit decreases a gain of the waveform generation circuit, wherein the control circuit determines whether or not the acquired value for the waveform signal exceeds a second threshold value lower than the first threshold value, and when the value exceeds the second threshold value, the control circuit initializes a second counter, and when the value falls short of the second threshold value, the control circuit increments the second counter by one, and when a count value of the second counter exceeds a second value, the control circuit performs gain control to increase a gain of the waveform generation circuit.

12. An optical receiver comprising:
a light receiving element that receives an optical signal and converts the optical signal into an electric signal;
a filter that is supplied with a waveform signal generated based on an output from the light receiving element;
a voltage generation circuit that generates a reference voltage to regulate a bias voltage for an output waveform output from the filter;
a variable gain amplifier that amplifies a filter output waveform output from the filter using a variable gain; and
a control circuit that controls the reference voltage based on an output from the variable gain amplifier and performs automatic gain control for the variable gain amplifier, wherein the control circuit boosts a bias voltage for a filter output waveform based on the reference voltage according to an unnecessarily dull output waveform from the variable gain amplifier and performs control so that a gain of the variable gain amplifier is smaller than a present gain.

13. The optical receiver according to claim 12,
wherein the control circuit determines that an output waveform from the filter unnecessarily dulls when an output from the variable gain amplifier may exceed a logical value determination threshold value and this state remains until a lapse of specified time shorter than a determination-slot time.

14. The optical receiver according to claim 12,
wherein, when determining that an output waveform from the filter does not unnecessarily dull, the control circuit assumes the bias voltage to be half a power-supply voltage, and wherein, when determining that an output waveform from the filter unnecessarily dulls, the control circuit assumes the bias voltage to be half the power-supply voltage increased by a voltage corresponding to a ratio of the present gain to a maximum gain of the variable gain amplifier.

15. The optical receiver according to claim 12,
wherein the control circuit determines a logical value for an output from the variable gain amplifier and waits until a lapse of specified time shorter than a determination-slot time from timing to determine the logical value, wherein, when the determined logical value exceeds a logical value determination threshold value, the control circuit further determines whether or not an output from the variable gain amplifier exceeds a first threshold value, wherein, when the logical value does not exceed the logical value determination threshold value, the control circuit initializes a first counter, wherein, when the logical value exceeds the logical value determination threshold value, the control circuit increments the first counter by one, wherein, when a count value of the incremented first counter exceeds a first value, the control circuit decreases a gain of the variable gain amplifier, wherein the control circuit determines whether or not an output from the variable gain amplifier exceeds a second threshold value lower than the first threshold value, wherein, when the output exceeds the second threshold value, the control circuit initializes a second counter, wherein, when the output falls short of the second threshold value the control circuit increments the second counter by one, and wherein, when a count value of the second counter exceeds a second value, the control circuit performs gain control to increase a gain of the variable gain amplifier.

16. An optical receiver comprising:

a light receiving element that receives an optical signal and converts the optical signal into an electric signal;

a waveform generation circuit that is supplied with an electric signal output from the light receiving element and generates a waveform signal based on filtering and amplification;

a control circuit that processes a waveform signal supplied from the waveform generation circuit;

an acceleration sensor; and a power supply switch that selects a power supply to the light receiving element, wherein, in a mode to receive position information using the optical signal, the control circuit turns on the power supply switch based on an output from the acceleration sensor only while movement of the optical receiver is sensed.

* * * * *